US011895583B2

(12) United States Patent
Yuan et al.

(10) Patent No.: US 11,895,583 B2
(45) Date of Patent: Feb. 6, 2024

(54) NETWORK CONNECTION PROCESSING METHOD, RELATED DEVICE, AND COMPUTER STORAGE MEDIUM

(71) Applicant: HONOR DEVICE CO., LTD., Guangdong (CN)

(72) Inventors: Kai Yuan, Shenzhen (CN); Yanzhao He, Shenzhen (CN); Chaofeng Lian, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 104 days.

(21) Appl. No.: 17/437,526

(22) PCT Filed: Mar. 3, 2020

(86) PCT No.: PCT/CN2020/077554
§ 371 (c)(1),
(2) Date: Sep. 9, 2021

(87) PCT Pub. No.: WO2020/182016
PCT Pub. Date: Sep. 17, 2020

(65) Prior Publication Data
US 2022/0159569 A1    May 19, 2022

(30) Foreign Application Priority Data

Mar. 9, 2019  (CN) .......................... 201910177518.5
Jun. 28, 2019  (CN) .......................... 201910588602.6

(51) Int. Cl.
*H04W 52/02*    (2009.01)
*H04W 76/15*    (2018.01)
(Continued)

(52) U.S. Cl.
CPC ..... *H04W 52/0216* (2013.01); *H04W 52/027* (2013.01); *H04W 52/0229* (2013.01);
(Continued)

(58) Field of Classification Search
CPC ......... H04W 52/0216; H04W 52/0229; H04W 52/027; H04W 52/0274; H04W 76/34; H04W 76/15; H04W 88/06
(Continued)

(56) References Cited

U.S. PATENT DOCUMENTS 8,498,208 B2    7/2013  Wang et al.
9,860,907 B2    1/2018  Behravan et al.
(Continued)

FOREIGN PATENT DOCUMENTS

CN    1960550 A    5/2007
CN    1997189 A    7/2007
(Continued)

OTHER PUBLICATIONS

3GPP TS 37.340 V15.3.0 (Sep. 2018), "3rd Generation Partnership Project; Technical Specification Group Radio Access Network; Evolved Universal Terrestrial Radio Access (E-UTRA) and NR; Multi-connectivity; Stage 2 (Release 15)," Sep. 2018, 59 pages.
(Continued)

*Primary Examiner* — Intekhaab A Siddiquee
(74) *Attorney, Agent, or Firm* — Fish & Richardson P.C.

(57) ABSTRACT

Embodiments of the present invention disclose a network connection processing method, an apparatus, and a wireless transceiver unit. The method is applied to a user equipment UE side and relates to the 5G NR and the field of artificial intelligence communications. The method includes: connecting UE to both a 4G base station and a 5G base station by using an LTE-NR dual connectivity technology; and when the UE is in a screen-off state and a data transmission rate of the UE is less than or equal to a preset rate, releasing a connection between the UE and the 5G base station. The embodiments of the present invention can solve problems such as high device power consumption and network
(Continued)

resource waste caused by the LTE-NR dual connectivity technology.

20 Claims, 11 Drawing Sheets

(51) Int. Cl.
  *H04W 76/34* (2018.01)
  *H04W 88/06* (2009.01)
(52) U.S. Cl.
  CPC ....... *H04W 52/0274* (2013.01); *H04W 76/15* (2018.02); *H04W 76/34* (2018.02); *H04W 88/06* (2013.01)
(58) Field of Classification Search
  USPC .......................................................... 370/311
  See application file for complete search history.

(56) References Cited

U.S. PATENT DOCUMENTS

| | | |
|---|---|---|
| 10,051,518 B2 | 8/2018 | Horn et al. |
| 10,141,983 B2 | 11/2018 | Kim et al. |
| 10,193,602 B1 | 1/2019 | Frydman et al. |
| 10,306,693 B2 | 5/2019 | Tang et al. |
| 10,785,675 B2 | 9/2020 | Lee et al. |
| 10,959,178 B2 | 3/2021 | Ali et al. |
| 11,228,952 B2 | 1/2022 | Ryoo et al. |
| 11,259,175 B2 | 2/2022 | Hong |
| 2009/0028084 A1 | 1/2009 | Ping |
| 2012/0135696 A1 | 5/2012 | Lerzer et al. |
| 2012/0329410 A1 | 12/2012 | Balakrishnan et al. |
| 2016/0242191 A1* | 8/2016 | Liao .................. H04W 24/10 |
| 2016/0302218 A1 | 10/2016 | Behravan et al. |
| 2017/0167745 A1 | 6/2017 | Dortmund et al. |
| 2017/0208488 A1 | 7/2017 | Hwang et al. |
| 2017/0280367 A1 | 9/2017 | Komati et al. |
| 2017/0318500 A1 | 11/2017 | Horn et al. |
| 2018/0242256 A1 | 8/2018 | Nenner et al. |
| 2018/0270682 A1 | 9/2018 | Zacharias et al. |
| 2018/0368016 A1* | 12/2018 | Lee .................. H04W 76/15 |
| 2019/0069205 A1* | 2/2019 | Lee .................. H04W 36/00835 |
| 2019/0159274 A1 | 5/2019 | Hong et al. |
| 2019/0215885 A1* | 7/2019 | Wu .................. H04W 76/27 |
| 2020/0022215 A1 | 1/2020 | Takahashi et al. |
| 2020/0128479 A1 | 4/2020 | Xu et al. |
| 2020/0187209 A1 | 6/2020 | Tamura et al. |
| 2020/0374965 A1 | 11/2020 | Liu |
| 2022/0046546 A1 | 2/2022 | Wang et al. |
| 2022/0060922 A1 | 2/2022 | Zhuang et al. |
| 2022/0070760 A1 | 3/2022 | Tang et al. |
| 2022/0070771 A1 | 3/2022 | Tang et al. |
| 2022/0078682 A1 | 3/2022 | Wang et al. |
| 2022/0078703 A1 | 3/2022 | Xia et al. |
| 2022/0110083 A1 | 4/2022 | Wang et al. |

FOREIGN PATENT DOCUMENTS

| | | | | |
|---|---|---|---|---|
| CN | 102695257 A | 9/2012 | | |
| CN | 103747512 A | 4/2014 | | |
| CN | 105228229 A | 1/2016 | | |
| CN | 105517069 A | 4/2016 | | |
| CN | 106028375 A | 10/2016 | | |
| CN | 106302984 A | * 1/2017 | ........ | H04M 1/72505 |
| CN | 106302984 A | 1/2017 | | |
| CN | 106304205 A | 1/2017 | | |
| CN | 106357910 A | 1/2017 | | |
| CN | 106664606 A | 5/2017 | | |
| CN | 107087442 A | 8/2017 | | |
| CN | 107333326 A | 11/2017 | | |
| CN | 107635261 A | 1/2018 | | |
| CN | 108632851 A | 10/2018 | | |
| CN | 109246834 A | 1/2019 | | |
| CN | 110267245 A | 9/2019 | | |
| CN | 106714270 B | 10/2020 | | |
| CN | 110300461 B | 6/2021 | | |
| JP | 2012533969 A | 12/2012 | | |
| JP | 2013125426 A | 6/2013 | | |
| KR | 20180004393 A | 1/2018 | | |
| KR | 101950791 B1 | 2/2019 | | |
| KR | 20210106958 A | 8/2021 | | |
| RU | 2632211 C2 | 10/2017 | | |
| WO | 2015170917 A1 | 11/2015 | | |
| WO | 2016039577 A1 | 3/2016 | | |
| WO | 2017204539 A1 | 11/2017 | | |
| WO | 2018029578 A1 | 2/2018 | | |
| WO | 2018126547 A1 | 7/2018 | | |
| WO | 2018130115 A1 | 7/2018 | | |
| WO | 2018174038 A1 | 9/2018 | | |
| WO | 2018191917 A1 | 10/2018 | | |
| WO | 2018202777 A1 | 11/2018 | | |
| WO | 2019028714 A1 | 2/2019 | | |
| WO | 2019031528 A1 | 2/2019 | | |

OTHER PUBLICATIONS

Intel Corporation, "Control plane aspects for LTE-NR interworking," 3GPP TSG RAN WG2 Meeting #93bis, R2-162711, Dubrovnik, Croatia, Apr. 11-15, 2016, 3 pages.

Liu et al., "Discussion on LTE-NR Dual Connection Technique," Mobile Communications, 2017, 41(19), Jun. 21, 2017, 7 pages (with English abstract).

TR 21.915 V0.7.0, "3rd Generation Partnership Project; Technical Specification Group Services and System Aspects; Release 15 Description; Summary of Rel-15 Work Items (Release 15)," Feb. 2019, 109 pages.

* cited by examiner

NETWORK CONNECTION PROCESSING METHOD, RELATED DEVICE, AND COMPUTER STORAGE MEDIUM

CROSS-REFERENCE TO RELATED APPLICATIONS

This application is a National Stage of International Application No. PCT/CN2020/077554, filed on Mar. 3, 2020, which claims priority to Chinese Patent Application No. 201910588602.6, filed on Jun. 28, 2019, and Chinese Patent Application No. 201910177518.5, filed on Mar. 9, 2019. The disclosures of the aforementioned applications are hereby incorporated by reference in their entireties.

TECHNICAL FIELD

The present invention relates to the field of communications technologies, and in particular, to a network connection processing method, a related device, and a computer storage medium.

BACKGROUND

The concept of dual connectivity is introduced in the LTE R12 standard. To be specific, user equipment (user equipment, UE) may use independent physical resources of two base stations at the same time in a radio resource control (radio resource control, RRC) connected mode for transmission. The LTE dual connectivity technology expands application of carrier aggregation, and can effectively increase network capacities and improve capabilities such as network switching power.

LTE-NR dual connectivity, as an important application technology of LTE dual connectivity, is also referred to as 4G-5G wireless access dual connectivity (EUTRN-NR dual connectivity, EN-DC), and mainly involves a 4G E-UTRAN access network (also referred to as an LTE access network) and a 5G new random access standard (new random access technology, NR) access network (abbreviated as an NR access network). In this way, deployment of a 5G network may use existing 4G LTE coverage to avoid network resource waste.

In the LTE dual connectivity technology, UE may be connected to a 4G base station (which may be referred to as an eNB) and a 5G base station (which may be referred to as an En-gNB) at the same time, and obtain a wireless transmission service with a high rate and a low delay based on close 4G-5G interoperability. Compared with a working mode of a single access network, for example, communication using only a 4G LTE technology, the LTE dual connectivity technology leads to high power consumption of user equipment. In addition, in a scenario having a low network usage requirement, an LTE access network can ensure a network connection requirement of user equipment. If the LTE-NR dual connectivity technology is still used, network resource waste is inevitably caused and power consumption of the user equipment is increased.

SUMMARY

Embodiments of the present invention disclose a network connection processing method, a related device, and a computer storage medium, to solve problems such as high device power consumption and network resource waste in communication using an LTE-NR dual connectivity technology in a scenario of a low network speed in conventional technologies.

According to a first aspect, an embodiment of the present invention provides a network connection processing method. The method is applied to a user equipment UE side and includes: connecting UE to both a 4G base station and a 5G base station by using an LTE-NR dual connectivity technology; and when the UE is in an application scenario of a low network speed, releasing a connection between the UE and the 4G base station or the 5G base station. The connection between the UE and the 4G base station is also referred to as an LTE connection, and the connection between the UE and the 5G base station is also referred to as an NR connection. Therefore, this can solve problems such as high device power consumption and network resource waste in communication still using LTE-NR dual connectivity in an application scenario of a low network speed in conventional technologies.

The application scenario of a low network speed is an application scenario in which the UE has a low network usage requirement, and may be specifically indicated by a low data transmission rate of the UE, a small data packet that needs to be transmitted by the UE, or the like. When the UE detects any one or a combination of the following, it may be determined that the UE is in the application scenario of a low network speed:

(1) The UE is in a screen-on state and runs at a low network speed. A low network speed means that a data transmission rate of the UE is low. For example, specifically, it may mean that a transmission rate of the UE for uplink data is less than a first preset rate, for example, 50 kbit/s; or may mean that a transmission rate of the UE for downlink data is less than a second preset rate, for example, 60 kbit/s; or may mean that a transmission rate of the UE for all data including uplink data and downlink data is less than a third preset threshold, for example, 100 kbit/s. In an actual application, the UE runs at a low network speed in a plurality of scenarios, and the following three scenarios are used as examples. For example, in the first scenario, in the UE, a function of running an application of a low network speed is enabled, and a function of running an application of a high network speed is disabled. The application of a low network speed is an application that is deployed in the UE and has a low requirement on a data transmission rate, for example, a requirement that the data transmission rate is less than a preset rate. In contrast, the application of a high network speed is an application that is deployed in the UE and has a high requirement on a data transmission rate, for example, a video application. In the second scenario, the UE exchanges a heartbeat packet with another device to maintain a normal communication connection, or the like. In the third scenario, the UE is in a scenario of running at a low network speed, for example, a game scenario or a navigation scenario. The game scenario has a high requirement on CPU usage. The navigation scenario has a high requirement on heat dissipation performance of a device, but has a low requirement on a network speed (that is, a data transmission rate).

(2) The UE is in a screen-on state and a size of a data packet that needs to be transmitted by the UE is less than or equal to a first preset threshold.

(3) A mobile data communication function of the UE is disabled.

(4) An overall temperature of the UE is greater than or equal to a preset temperature threshold. In an actual application, the overall temperature of the UE may usually be replaced by temperatures of some core devices in the UE, for example, a CPU temperature, an SOC temperature, and a battery temperature.

(5) The UE is in a screen-off state and runs at a low network speed. In this embodiment, the UE is in the screen-off state and runs at a low network speed also in a plurality of scenarios. For example, the UE still supports running of an application in the background in the screen-off state. In this case, to satisfy a low network usage requirement, the function of running an application of a low network speed may be enabled, and the function of running an application of a high network speed may be disabled. In another example, the UE transmits or receives no data in the screen-off state, or only transmits a data packet such as a heartbeat test packet or a monitoring data packet for keeping an application program in an awake state. This type of data packet is sent periodically, and a transmission rate and a size of the data packet are usually small. In this case, it may be considered that the UE runs at a low network speed.

(6) The UE is in a screen-off state and a size of a data packet that needs to be transmitted by the UE is less than or equal to a second preset threshold.

Optionally, regardless of a screen state that the UE is in, when identifying the application scenario of a low network speed through a data transmission rate of the UE, to ensure accuracy of identifying the application scenario of a low network speed, the UE may further limit the data transmission rate. For example, the UE calculates a corresponding duration for which the data transmission rate of the UE is less than or equal to a preset rate. If the duration exceeds a particular threshold, it may be determined that the UE is in the application scenario of a low network speed. Otherwise, it is determined that the UE is not in the application scenario of a low network speed.

Optionally, when LTE can meet a low network usage requirement of the UE (that is, LTE can satisfy the application scenario of a low network speed), the UE may be preferentially disconnected from the 5G base station, that is, preferentially release the NR connection in LTE-NR dual connectivity. For example, in an LTE-NR dual connectivity state, when the UE is in the screen-off state and the data transmission rate of the UE is less than the preset rate, the connection between the UE and the 5G base station is released.

With reference to the first aspect, in some possible embodiments, the UE includes a non-access stratum NAS and a radio resource control RRC layer. When determining that the UE is in the application scenario of a low network speed, an application processor AP of the UE may send a first notification message to the NAS. The first notification message is used for notifying that the UE is in the application scenario of a low network speed, or is specifically used for notifying a condition for identifying the application scenario of a low network speed. After receiving the first notification message, the NAS may send a second notification message to the RRC layer, to instruct the RRC layer to stop measurement of the connection between the UE and the 4G base station or the 5G base station, that is, stop LTE or NR measurement. Optionally, the second notification message is further used for instructing the RRC layer not to support the connection between the UE and the 4G base station or the 5G base station. Correspondingly, after receiving the second notification message, the RRC layer may disable a function of connection and communication between the UE and the 4G base station or the 5G base station, and stop the measurement of the connection between the UE and the 4G base station or the 5G base station, thereby stopping the LTE or NR measurement. In this way, the RRC layer subsequently cannot send a corresponding measurement report to a network side (which may be specifically the 4G base station or the 5G base station on the network side).

Optionally, when determining that the UE is in the application scenario of a low network speed, the application processor AP may send the first notification message to the NAS through a private command message or an existing command message. When the AP sends the first notification message through the private command message, the UE side does not sense a radio access network used by the UE for communication. After the connection between the UE and the 4G base station or the 5G base station is released, a user cannot learn, through an icon displayed in an interface of the UE, of a base station or an access network connected to the UE for communication. In this case, the icon displayed in the interface of the UE does not change. For example, the displayed icon is 4G-5G in LTE-NR dual connectivity, and the displayed icon is still 4G-5G after the LTE connection or the NR connection is released.

When the AP sends the first notification message through the existing command message, the icon displayed in the interface of the UE changes, and the user may learn, through the displayed icon, of the base station or the access network connected to the UE for communication. For example, the displayed icon is 4G-5G in LTE-NR dual connectivity, the displayed icon is 5G after the LTE connection is released, and the displayed icon is 4G after the NR connection is released.

Optionally, the first notification message and the second notification message carry corresponding indication flag bits, to instruct to perform a corresponding functional operation or functional notification. For example, when the first notification message carries "030201", it means that the UE does not support 5G communication and the connection between the UE and the 5G base station may be released, that is, the NR connection may be released. When the first notification message carries "08030201", it means that the UE supports 5G communication and the connection between the UE and the 5G base station may be reestablished, that is, the NR connection may be reestablished.

With reference to the first aspect, in some possible embodiments, the RRC layer may send a signaling message to the network side to correspondingly release a radio resource occupied on a base station side when the connection between the UE and the 4G base station or the 5G base station is configured, to correspondingly release the connection between the UE and the 4G base station or the 5G base station on the base station side. Specifically, during releasing of the connection between the UE and the 4G base station, the RRC layer may send a signaling message to the 4G base station, to instruct the 4G base station to release a radio resource occupied on a 4G base station side when the connection between the UE and the 4G base station is configured, to correspondingly release the connection between the UE and the 4G base station on the 4G base station side.

During releasing of the connection between the UE and the 5G base station, the RRC layer may send an SCG link failure message to the 5G base station, to release a radio resource occupied on the 5G base station side when the connection between the UE and the 5G base station is configured, to release the connection between the UE and the 5G base station on the 5G base station side. The SCG link failure message may have different specifications in different protocol versions. For example, in the R12 protocol version, the SCG link failure message may be a signaling message SCGFailureInformation-r12-IEs and includes parameters such as a failure type failureType-r12. The failure type includes any one or a combination of the following parameters: a timer delay (that is, a data transmission delay supported on the UE side and the network side), a random access problem randomAccessProblem, an RLC maximum number of retransmissions rlc-MaxNumRetx (an allowed maximum number of RLC data packet retransmissions), an SCG link change failure scg-ChangeFailure (that is, switching of an SCG link is not supported), and the like.

With reference to the first aspect, in some possible embodiments, the UE further includes a non-access stratum NAS. The NAS may send a signaling message to a corresponding base station to instruct the base station to release a radio resource occupied on the base station side when the connection between the UE and the 4G base station or the 5G base station is configured, to release the connection between the UE and the 4G base station or the 5G base station on the base station side. For example, the connection between the UE and the 5G base station is released. The NAS may send a first TAU message to the 5G base station, to instruct the 5G base station not to support a 5G connection. Correspondingly, after receiving the first TAU message, the 5G base station determines not to support communication using the 5G connection, and may further release the radio resource occupied on the 5G base station side when the connection between the UE and the 5G is configured, to release the connection between the UE and the 5G base station on the 5G base station side.

Optionally, the first TAU message carries an indication parameter, to instruct not to support a communication function of the connection between the UE and the 4G base station or the 5G base station. Indication information may be in the form of a specified character, numeric value, character string, or array.

With reference to the first aspect, in some possible embodiments, after the connection between the UE and the base station (for example, the 4G base station or the 5G base station) is released, the base station side may send a first RRC reconfiguration message to the RRC layer. The first RRC reconfiguration message is used for instructing the RRC layer to release a radio resource occupied on the UE side when the connection between the UE and the 4G base station or the 5G base station is configured, to release the connection between the UE and the 4G base station or the 5G base station on the UE side. Correspondingly, in response to the first RRC reconfiguration message, the RRC layer may release the radio resource occupied on the UE side when the connection between the UE and the 4G base station or the 5G base station is configured, to release the connection between the UE and the 4G base station or the 5G base station on the UE side.

Optionally, the first RRC reconfiguration message carries a release releast field, which is specifically used for instructing the RRC layer to release a UE-side configuration parameter such as a cell ID, a downlink receiving channel or a frequency that is associated with configuration of the connection between the UE and the 4G base station or the 5G base station.

With reference to the first aspect, in some possible embodiments, after the RRC layer releases the connection between the UE and the 4G base station or the 5G base station on the UE side, the RRC layer may send a third notification message to the NAS, to notify that currently the connection between the UE and the 4G base station or the 5G base station is already released on the UE side.

With reference to the first aspect, in some possible embodiments, when the UE is not in the application scenario of a low network speed, the connection between the UE and the 4G base station or the 5G base station may be reestablished, that is, restoring both the connection between the UE and the 4G base station and the connection between the UE and the 5G base station helps improve a network rate of the UE.

Optionally, a specific implementation in which the UE is not in the application scenario of a low network speed is not limited. For example, the UE does not meet the foregoing six detection conditions under which the UE is in the application scenario of a low network speed. For example, the UE is in the screen-on state.

With reference to the first aspect, in some possible embodiments, the UE includes a NAS and an RRC layer. After determining that the UE is not in the application scenario of a low network speed, the application processor AP of the UE may send a fourth notification message to the NAS, to notify that the UE is not in the application scenario of a low network speed and the connection between the UE and the 4G base station or the 5G base station needs to be reestablished. Correspondingly, after receiving the fourth notification message, the NAS sends a fifth notification message to the RRC layer, to instruct the RRC layer to support the connection between the UE and the 4G base station or the 5G base station, and to restore or start measurement of the connection between the UE and the 4G base station or the 5G base station, that is, start the LTE or NR measurement. Correspondingly, the RRC layer starts the LTE or NR measurement in response to the fifth notification message, so that the UE subsequently sends a measurement report to a corresponding base station.

With reference to the first aspect, in some possible embodiments, the RRC layer may send a sixth notification message to the 4G base station or the 5G base station to notify a radio resource that needs to be occupied on the base station side when the connection between the UE and the 4G base station or the 5G base station is reconfigured, to correspondingly reestablish the connection between the UE and the 4G base station or the 5G base station on the 4G base station side or the 5G base station side. Correspondingly, the base station side receives the sixth notification message, and reconfigures the radio resource that needs to be occupied on the base station side when the UE is connected to the base station, to reestablish the connection between the UE and the base station on the base station side.

With reference to the first aspect, in some possible embodiments, after receiving the first notification message, the NAS may send a signaling message to the 4G base station or the 5G base station to instruct to currently support the connection between the UE and the 4G base station or the 5G base station, to reestablish the connection between the UE and the 4G base station or the 5G base station on the base station side. The reestablishment of the connection between the UE and the 5G base station is used as an example. The NAS may send a second TAU message to the 5G base station, to instruct the 5G base station to support the connection between the UE and the 5G base station. Correspondingly, after receiving the second TAU message, the 5G base station may reconfigure a radio resource that needs to be occupied on the 5G base station side when the UE is connected to the 5G base station, to reestablish the connection between the UE and the 5G base station on the 5G base station side.

With reference to the first aspect, in some possible embodiments, after the connection between the UE and the 4G base station or the 5G base station is reestablished, the 4G base station or the 5G base station may send a second RRC reconfiguration message to the RRC layer to instruct the RRC layer to reconfigure a radio resource that needs to be occupied on the UE side when the UE is connected to the 4G base station or the 5G base station, to reestablish the connection between the UE and the 4G base station or the 5G base station on the UE side. Correspondingly, in response to the second RRC reconfiguration message, the RRC layer reconfigures the radio resource that needs to be occupied on the UE side when the UE is connected to the 4G base station or the 5G base station, to reestablish the connection between the UE and the 4G base station or the 5G base station on the UE side.

Optionally, the second RRC reconfiguration message carries a configuration field spCellConfig. The field carries a configuration parameter to reestablish the connection between the UE and the 4G base station or the 5G base station. For example, the configuration parameter includes a downlink receiving channel, a frequency, and a cell identifier ID.

According to a second aspect, an embodiment of the present invention provides user equipment, including functional units configured to perform the method according to the first aspect.

According to a third aspect, an embodiment of the present invention provides another user equipment, including a memory and at least one processor coupled to the memory. The memory is configured to store instructions, the processor is configured to execute the instructions, and when the processor executes the instructions, the method according to the first aspect is performed.

In some possible implementations, the user equipment further includes a communications interface. The communications interface communicates with the processor, and the communications interface is configured to communicate with another device (for example, a network device) under the control of the processor.

According to a fourth aspect, an embodiment of the present invention provides a wireless transceiver unit, including a non-access stratum NAS entity and a radio resource control RRC entity. The NAS entity is configured to perform related implementation steps performed by a NAS according to the first aspect, and the RRC entity is configured to perform related implementation steps performed by an RRC layer according to the first aspect. For example, the NAS entity is configured to:

receive a first RRC reconfiguration message sent by a 5G base station, where the first RRC reconfiguration message is used for instructing the RRC layer to release a radio resource occupied on a UE side when a connection between the UE and the 5G base station is configured, to release the connection between the UE and the 5G base station on the UE side; and release, according to the instruction of the first RRC reconfiguration message, the radio resource occupied on the UE side when the connection between the UE and the 5G base station is configured, to release the connection between the UE and the 5G base station on the UE side.

According to a fifth aspect, an embodiment of the present invention provides a system chip (for example, an SOC chip), including an application processor AP and a baseband processor BP. The baseband processor includes a NAS and an RRC layer. The application processor is configured to determine whether UE is in an application scenario of a low network speed. The baseband processor is configured to: when the UE is in the application scenario of a low network speed, release a connection between the UE and a 4G base station or a 5G base station.

For example, the baseband processor is configured to connect user equipment UE to both the 4G base station and the 5G base station by using an LTE-NR dual connectivity technology of a radio access network.

The application processor is configured to determine that the UE is in a screen-off state and a data transmission rate of the UE is less than or equal to a preset rate.

The baseband processor is further configured to: when the UE is in the screen-off state and the data transmission rate of the UE is less than or equal to the preset rate, release a connection between the UE and the 5G base station.

In the embodiments of the present invention, for contents not shown or described, reference may be specifically referred to the related descriptions in the embodiments of the foregoing first aspect. Details are not described herein again.

According to a sixth aspect, a computer-readable storage medium is provided, storing program code for network connection processing. The program code includes instructions for performing the method according to the first aspect.

In the present invention, based on the implementations according to the foregoing aspects, further combination may be performed, to provide more implementations.

BRIEF DESCRIPTION OF DRAWINGS

To describe the technical solutions of the embodiments of the present invention or the prior art more clearly, the following briefly introduces the accompanying drawings required for describing the embodiments or the prior art.

DESCRIPTION OF EMBODIMENTS

The following describes technical solutions in embodiments of the present invention in detail with reference to the accompanying drawings of the present invention.

First, some technical knowledge of this application is described.

1. LTE-NR Dual Connectivity Technology

In the LTE-NR dual connectivity technology, UE is connected to two base stations at the same time, which are referred to as a master base station (master eNB, MeNB) and a secondary base station (secondary eNB, SeNB). Dual connectivity may implement carrier aggregation, and specific bearers of carrier aggregation are split at a media access control (media access control, MAC) layer. Physical layer resources of the two base stations need to be synchronously scheduled at the MAC layer. Bearers of dual connectivity are split at a packet data convergence protocol (packet data convergence protocol, PDCP) layer, and the two base stations may independently schedule physical layer resources without strict synchronization. The following mainly describes the LTE-NR dual connectivity technology on a user plane and a control plane in detail.

1.1 Control Plane

Figure 1:
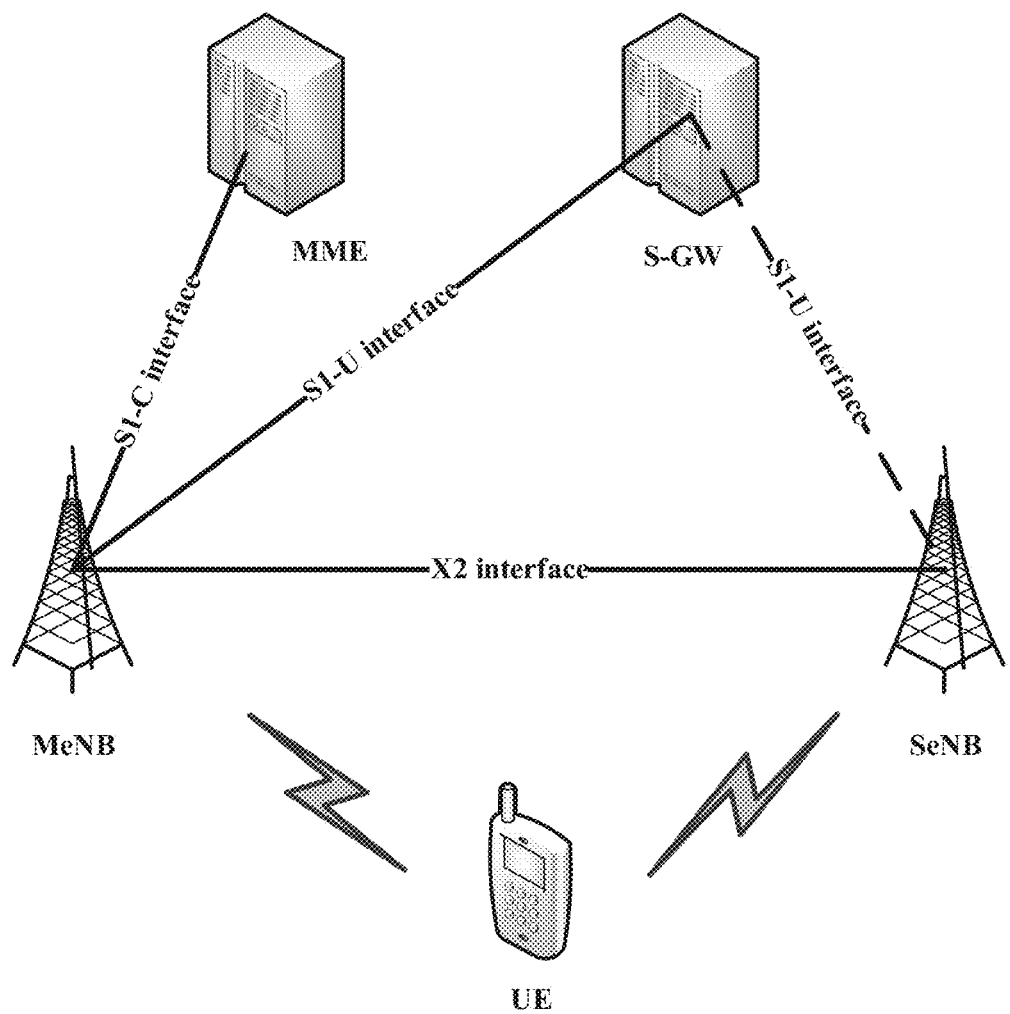
FIG. 1 is a schematic diagram of a system network architecture according to an embodiment of the present invention.

FIG. 1 is a schematic diagram of a system network architecture to which the LTE-NR dual connectivity technology is applicable. The system network architecture shown in FIG. 1 includes a master base station MeNB, a secondary base station SeNB, user equipment UE, a mobility management entity (mobility management entity, MME), and a serving gateway (serving gateway, S-GW). Quantities of master base stations, secondary base stations, and user equipments are not limited. Herein, one master base station, one secondary base station, and one user equipment are used as an example, and constitute no limitation.

A base station (which may be specifically a MeNB or a SeNB) provides an air interface to the user, and the user equipment UE is connected to the base station in a wireless manner. Further, the base station is connected to a core network of an operator in a wired manner, to implement service communication.

The user equipment UE is a device that supports network connection, and may include but is not limited to a mobile phone, a tablet personal computer (table personal computer), a personal digital assistant (personal digital assistant, PDA), a mobile Internet device (mobile Internet device, MID), a wearable device (wearable device), and other devices that support communication with a network.

The mobility management entity MME is a network element of a core network, and is mainly responsible for providing non-standalone (non-standalone, NSA) networking signaling transmission, user authentication, roaming management, and the like. The serving gateway S-GW is mainly responsible for processing user data of a local network, for example, routing or forwarding packet data.

As shown in the figure, the master base station MeNB and the mobility management entity MME are connected by an S1-C interface, and the master base station MeNB and the serving gateway S-GW are connected by an S1-U interface. The master base station MeNB and the secondary base station SeNB may be connected by an X2-C interface. The secondary base station SeNB may be connected to the S-GW by an S1-U interface according to an actual service requirement. In a communication process, the master base station MeNB may perform communication coordination with the secondary base station SeNB through the X2-C interface, to generate an RRC message, and then forward the RRC message to the UE, to perform functions such as broadcasting of network system information, switching, measurement configuration, and reporting of a measurement report. This constitutes no limitation.

Figure 2:
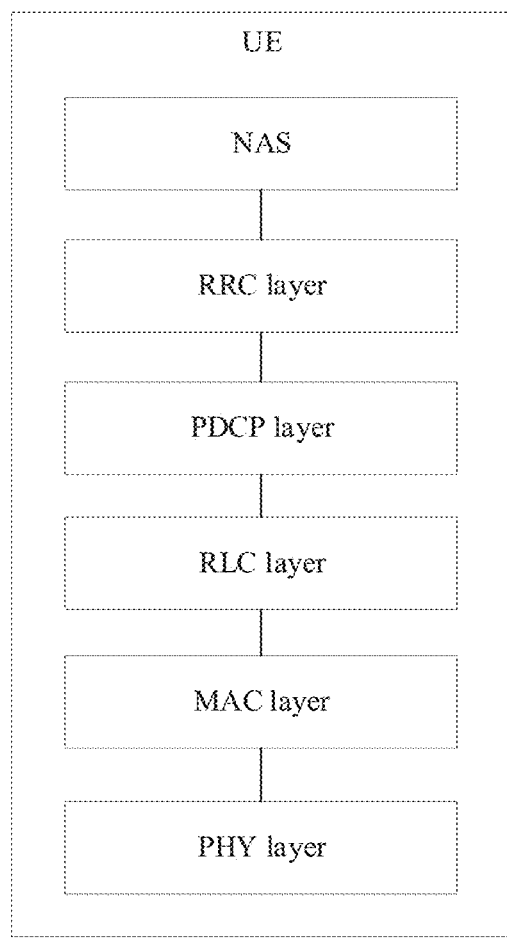
FIG. 2 is a schematic diagram of layered communication in an interface protocol of user equipment according to an embodiment of the present invention.

In an actual application, the interface is a method for information exchange between different network elements, and interface protocols used in communication between different interfaces may be different. Currently, an interface protocol of a wireless standard is divided into three layers: an L1 physical layer (physical layer, PHY), an L2 data link layer, and an L3 network layer. For example, FIG. 2 is a schematic diagram of layered communication in an interface protocol of user equipment UE. As shown in FIG. 2, the L1 physical layer PHY is located at the bottom and is mainly responsible for processing modulation and demodulation, antenna mapping, or other physical layer functions in telecommunication.

The L2 data link layer includes a PDCP layer, a radio link control (radio link control, RLC) layer, and a MAC layer. The PDCP layer is mainly responsible for performing header compression to reduce bitstreams transmitted by a radio interface. The RLC layer is mainly responsible for processing such as segmentation, connection, and sequence control of higher-layer data. The MAC layer is mainly responsible for hybrid automatic repeat request (hybrid automatic repeat request, HARQ) retransmission, uplink and downlink scheduling, and the like. In an actual application, in the LTE-NR dual connectivity technology, bearers of carrier aggregation may be specifically split at the L2 data link layer. As specifically described above, bearers of the carrier aggregation are specifically split at the media access control (medium access control, MAC) layer, and bearers of dual connectivity are split at the packet data convergence protocol (packet data convergence protocol, PDCP) layer.

The L3 network layer includes a non-access stratum (non-access stratum, NAS) and an RRC layer. The non-access stratum NAS may be configured to transmit user information or control information, for example, information about establishment, release, and mobility management of a 4G/5G communication link or service. A protocol layer below the NAS may also be referred to as an access stratum (AS). The RRC layer supports signaling protocols of a plurality of functions between the user equipment UE and a base station eNB, broadcasts system messages of the NAS and the AS, establishes, maintains, and releases an RRC connection, establishes, modifies, and releases an end-to-end radio bearer (for example, a radio access network link between the UE and a network side), and performs mobility management including functions such as UE measurement reporting and cell handover and reselection. In an actual application, the UE may communicate with the network side through the L3 network layer to perform operations such as establishing and releasing 4G and 5G access networks. Details are described below in this application.

1.2 User Plane

The LTE-NR dual connectivity technology defines a master cell group (master cell group, MCG) and a secondary cell group (secondary cell group, SCG). According to different data splitting and forwarding methods, data bearers are classified into three types: an MCG bearer, an SCG bearer, and a split bearer. The master cell group MCG is a cluster of cells in which at least one master base station MeNB is located, and the secondary cell group is a cluster of cells in which at least one secondary base station SeNB is located.

In an actual application, data bearers sensed by the UE and the network side are all different. Specifically, FIG. 3 and FIG. 4 show communication links of data bearers of the UE and communication links of data bearers of the network side respectively.

Figure 3:
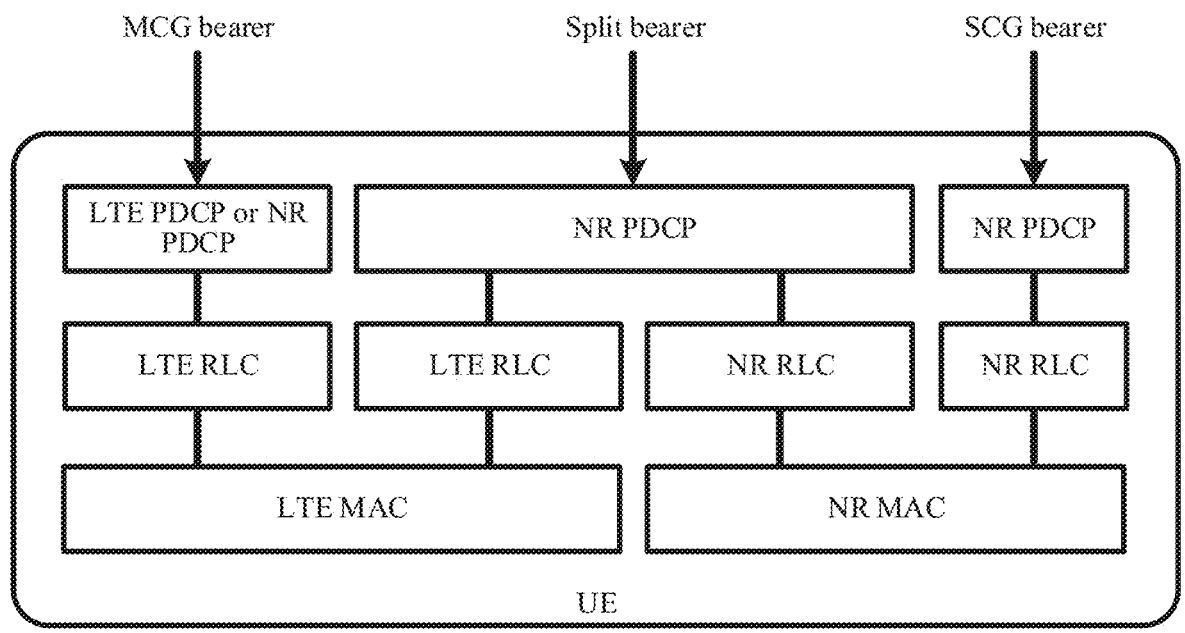
FIG. 3 is a schematic diagram of communication of sensing data bearers by user equipment according to an embodiment of the present invention.
Figure 4:
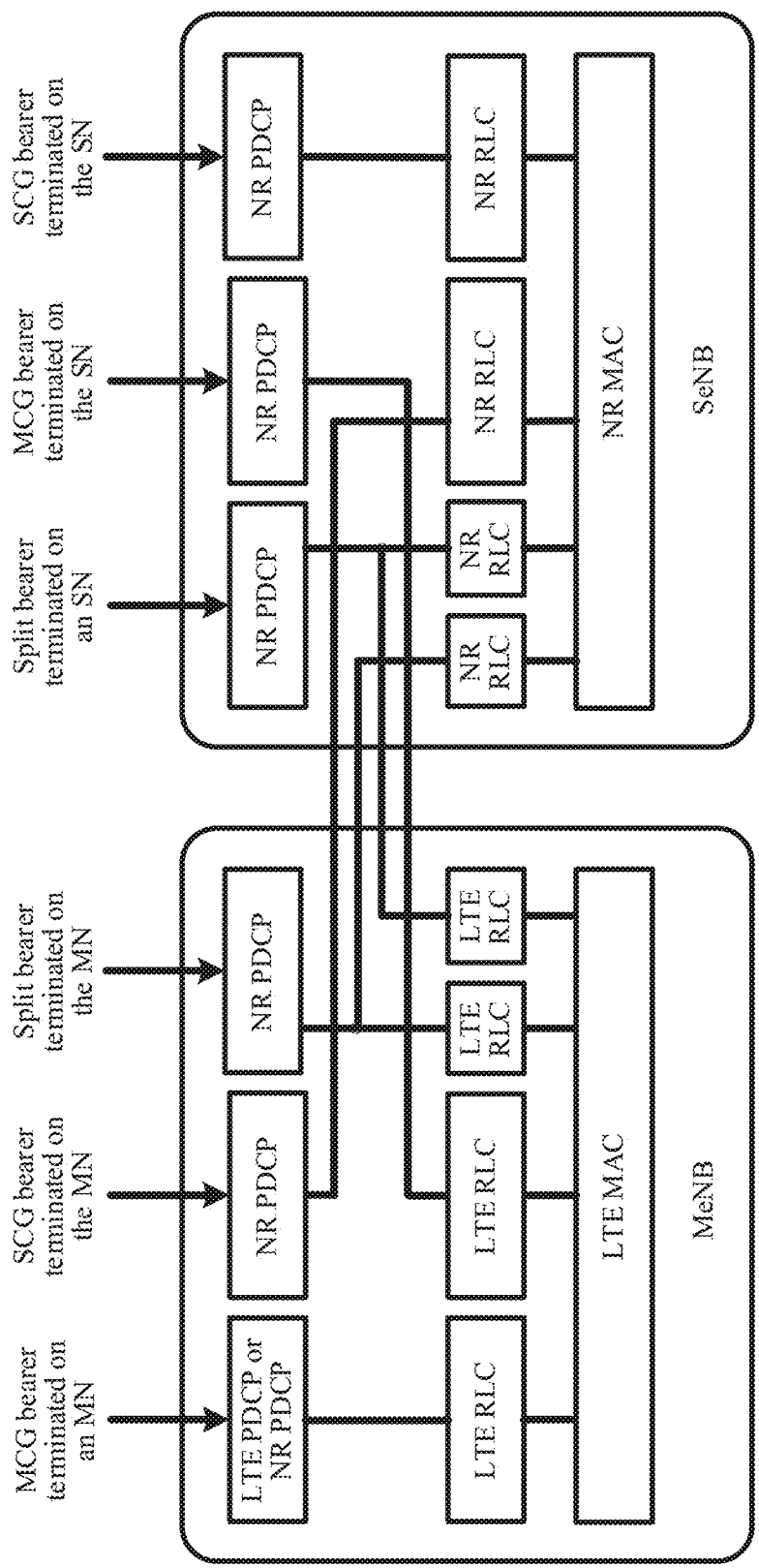
FIG. 4 is a schematic diagram of communication of sensing data bearers by a network side according to an embodiment of the present invention.

As shown in FIG. 3, the UE senses three types of data bearers: an MCG bearer, an SCG bearer, and a split bearer.

The MCG bearer means that data is routed from an S-GW of a core network to the master base station MeNB and the MeNB directly forwards the data to the UE. The SCG bearer means that data is routed from an S-GW of a core network to the secondary base station SeNB and the SeNB directly forwards the data to the UE. The split bearer means that data is split on a base station side, and may be forwarded by the master base station MeNB or the secondary base station SeNB to the UE, or may be transmitted by the master base station MeNB and the secondary base station SeNB to the UE at the same time according to a preset split ratio, to provide a service.

As shown in FIG. 3, when the UE senses that the data bearer is an MCG bearer, a communication link (also referred to as an MCG link) used in data communication is: LTE PDCP/NR PDCP-LTE RLC-LTE MAC. When the UE senses that the data bearer is an SCG bearer, a communication link (also referred to as an SCG link) used in data communication is: NR PDCP-NR RLC-NR MAC. When the UE senses that the data bearer is a split bearer, a communication link (also referred to as a split link) used in data communication is: NR PDCP-LTE RLC-LTE MAC or NR PDCP-NR RLC-LTE MAC. Because the SCG link uses a network resource of only 5G NR, this SCG link may also be referred to as an NR link. Because the MCG link uses a network resource of 4G LTE, this MCG link may also be referred to as an LTE link.

FIG. 4 is a schematic diagram of communication of sensing data bearers on the network side. As shown in FIG. 4, the network side senses data bearers in six manners: an MCG bearer terminated on a master node (master node, MN, which may specifically refer to a master base station MeNB), an SCG bearer terminated on the MN, a split bearer terminated on the MN, an MCG bearer terminated on a secondary node (secondary node, SN, which may specifically refer to a secondary base station SeNB), an SCG bearer terminated on the SN, and a split bearer terminated on the SN.

The bearer terminated on the MN is a radio bearer whose PDCP layer is on the master base station MeNB and is not on the secondary base station SeNB. In contrast, the bearer terminated on the SN is a radio bearer whose PDCP layer is on the secondary base station SeNB and is not on the master base station MeNB. As shown in FIG. 4, when the data bearer sensed on the network side is the MCG bearer terminated on the MN, a communication link used in data communication is: LTE PDCP/NR PDCP-LTE RLC-LTE MAC. When the data bearer sensed on the network side is the split bearer terminated on the MAN, a communication link used in data communication is: NR PDCP-LTE RLC-LTE MAC or NR PDCP-NR RLC-LTE MAC. This can be specifically selected according to an actual requirement and is not limited. Communication links corresponding to data bearers sensed on the network side are specifically shown in the figure, and are not described in detail herein.

2. Networking

Currently, the 3GPP standard defines two types of network deployment methods: standalone (standalone, SA) networking and non-standalone (non-standalone, NSA) networking. In standalone networking, a new existing network is created and includes a new base station (En-gNB), a communication link (an NR link), and a core network. In non-standalone networking, the existing 4G infrastructure is used to deploy a 5G network.

For 5G, the non-standalone NAS networking based on the LTE-NR dual connectivity technology may allow stepwise deployment of a core network and the 5G access network, which is conducive to rapid deployment and application of 5G. When 5G deployment enters the stage of standalone SA networking, the LTE-NR dual connectivity technology may expand coverage of a 5G network and improve network performance. It may be seen that the LTE-NR dual connectivity technology is an important application scenario in the scenario of 5G non-standalone NAS networking.

Then, some application scenarios of a low network speed are described. An application scenario of a low network speed is an application scenario in which the user equipment has a low network usage requirement, and may be specifically an application scenario in which a rate at which the user equipment UE transmits data (abbreviated as a data transmission rate) is low, or a size of a data packet that needs to be transmitted by the UE is small. In contrast, an application scenario in which the user equipment has a high network usage requirement may be referred to as an application scenario of a high network speed. For example, the following possible application scenarios of a low network speed are provided below:

1. The UE is in a screen-on state and runs at a low network speed. That is, a data transmission rate of the UE is less than or equal to a preset rate.

In this application, the low network speed means that the data transmission rate of the UE is low, for example, is less than or equal to the preset rate. Specifically, a low network speed may mean that a transmission rate of the UE for uplink data is low, for example, is less than or equal to a first preset rate; may mean that a transmission rate of the UE for downlink data is low, for example, is less than or equal to a second preset rate; or may mean that a transmission rate of the UE for all data including uplink data and downlink data is low, for example, is less than or equal to a third preset rate. For ease of description, the transmission rate of uplink data, the transmission rate of downlink data, and the transmission rate of all data including uplink data and downlink data are collectively referred to as a transmission rate of data in this application, and are abbreviated as a data transmission rate. The data transmission rate refers to a quantity of bits of data transmission supported by the UE in a unit time, for example, 50 bit/s.

The preset rate may be customized in a system, for example, customized according to a user preference or an actual requirement, or may be a value obtained through statistics of massive experimental data. The first preset rate, the second preset rate, and the third preset rate in this application are all customized in the system and may be the same or different, and there is no limitation.

In an actual application, the UE runs at a low network speed in many scenarios, and the following three scenarios are used as examples.

In the first scenario, in the UE, a function of running an application of a low network speed is enabled, and a function of running an application of a high network speed is disabled. Specifically, to meet a network usage requirement of a low network speed, the UE may set an application function in a power saving mode as follows: allowing running of an application of a low network speed, and prohibiting running of an application of a high network speed, that is, enabling a function of running an application of a low network speed, and disabling a function of running an application of a high network speed. It is understandable that after the function of running an application of a high network speed is disabled in the UE, only running of an application of a low network speed is allowed in the UE. Because a data transmission rate allowed in these applications of a low network speed is small, the UE may determine that the UE runs at a low network speed. Optionally, when a plurality of applications of a low network speed run in the UE at the same time, a sum of data transmission rates of the applications of a low network speed is also small, for example, is less than the preset rate, and a network usage requirement of a low network speed may also be met. In this case, it is still determined that the UE runs at a low network speed.

The application of a low network speed is an application that is deployed in the UE and has a low requirement on a data transmission rate, for example, a requirement that a transmission rate of to-be-transmitted data in the application is less than a fourth preset rate. The application of a low network speed may be customized in a system or manually customized by the user, and may be, for example, an application such as a camera application, a call application, an SMS application, and a memo application.

Correspondingly, the application of a high network speed is an application that is deployed in the UE and has a high requirement on a data transmission rate, for example, a requirement that a data transmission rate is greater than or equal to a fifth preset rate. The application of a high network speed may also be customized in a system or customized by the user according to personal preference, and may be, for example, a music application or a video application.

Optionally, to exclude a case that the UE temporarily runs at a low speed, a case of incorrect determining, or the like, a determining condition of a longer duration is set for the UE. For example, the UE may obtain a duration for which the data transmission rate of the UE is less than or equal to the preset rate. When the duration is greater than or equal to a particular threshold (for example, 1 minute), it may be determined that the UE runs at a low network speed. Otherwise, it is still determined that the UE does not run at a low network speed. That is, a condition for identifying that the UE is in the application scenario of a low network speed may be specifically: the UE is in the screen-on state and the data transmission rate of the UE is less than or equal to the preset rate within a period of time.

In the second scenario, the UE exchanges a heartbeat packet with another device to maintain a normal communication connection. Specifically, when the UE does not perform service communication with another device (for example, a base station), that is, the UE does not need to transmit service data, to maintain a communication connection between the UE and the another device, the UE may usually send the heartbeat packet to the another device periodically to notify that the UE keeps a communication connection with another device. In an actual application, a data transmission rate of the heartbeat packet is usually small, for example, a few kilobits per second. A size of the heartbeat packet is also small, for example, a few kilobits. Generally, the heartbeat packet may be an empty packet when carrying no service data, that is, carries only a header and does not carry service data.

In the third scenario, the UE is in a scenario of running at a low speed, for example, a game scenario or a navigation scenario. For example, in the game scenario, the UE is running a game application. In an actual application, the game application only has a high requirement on a running rate of a central processing unit (central processing unit, CPU) in the UE, and in comparison, has a low requirement on the data transmission rate (that is, a network rate) of the UE. Therefore, when the UE is in the game scenario, it may be determined that the UE runs at a low network speed.

In addition, in this application, screen states of the UE may be classified into a plurality of types: a screen-on state, a screen-off state, a locked state, and an unlocked state. In an actual application, the UE may be specifically in an unlocked screen-on state or a locked screen-on state. Generally, the UE is also in the locked state when the UE is in the screen-off state. The screen state of the UE may be specifically identified by using a software program detection method or a hardware detection method. The software program detection method is used as an example. The UE may first determine an on or off state of the screen based on a screen display value isScreenOn defined in man-machine interaction code isInteractive in power management powermanager. For example, when isScreenOn is true, it means that the UE is in the screen-on state; or otherwise, it is determined that the UE is in the screen-off state. After determining that the UE is in the screen-on state, the UE may then detect, based on screen lock code isScreenLocked, whether the UE is locked. If the UE is locked, it may be determined that the UE is in the locked state, and specifically the UE may be in the locked screen-on state. Otherwise, it is determined that the UE is in the screen-on state, and specifically the UE is in the unlocked screen-on state.

Alternatively, the UE may determine the screen state of the UE based on an Android broadcast message sent by the system of the UE. Specifically, when the Android broadcast message is used for indicating that the screen is on, it may be determined that the UE is in the screen-on state; when the Android broadcast message is used for indicating that the screen is off, it may be determined that the UE is in the screen-off state; when the Android broadcast message is used for indicating that the screen is locked, it may be determined that the UE is in the locked state, or the like. There may be a plurality of methods for identifying screen states of the UE, and the methods are not listed one by one herein in the present invention.

2. The UE is in a screen-on state and a size of a data packet that needs to be transmitted by the UE is less than or equal to a first preset threshold.

In the screen-on state, to satisfy the application scenario of a low network speed, the UE may consider not only the data transmission rate but also an amount of data that needs to be transmitted by the UE (that is, a size of a data packet that needs to be transmitted). The size of the data packet that needs to be transmitted by the UE may be specifically a size of all data packets that need to be transmitted by the UE in an application (that is, an amount of data that needs to be transmitted), or a size of a data packet that needs to be transmitted by the UE in a unit time.

Specifically, when the UE is in the screen-on state, if the size of the data packet that needs to be transmitted by the UE is large, for example, is greater than a first preset size threshold, the UE may consider that current communication load of the UE is high, that is, the data packet or the amount of data that needs to be transmitted is large, and the network usage requirement is high. Accordingly, the UE may consider that the UE is in an application scenario of a high network speed. Otherwise, if the size of the data packet that needs to be transmitted by the UE is small, the UE may consider that communication load of the UE is low, that is, the size of the data packet or the amount of data that needs to be transmitted is small, and the network usage requirement is not high. Accordingly, the UE may consider that the UE is in the application scenario of a low network speed.

3. The UE is in a disconnected state, that is, a mobile data communication function of the UE is disabled.

When the UE cannot be connected to a network (which may specifically refer to that a mobile data communication function or a mobile data connection function of the UE is disabled) in any screen state (for example, the screen-on state or the screen-off state), it may be directly determined that the UE is in the application scenario of a low network speed. In other words, when the UE is in the disconnected state, it may be directly determined that the UE is in the application scenario of a low network speed. The disconnected state herein does not mean complete network disconnection, and instead, refers to that a mobile network used by the user equipment for communication is disconnected and communication performed by the user equipment by using other data networks is not affected. Specifically, only the mobile data communication function of the UE may be disabled, for example, a 2G, 3G, or 4G internet access function of the UE is disabled, and a data network (for example, a telephone network) between the UE and the base station eNB is kept. At this time, the UE can still perform normal data communication with the base station. Complete network disconnection means that the UE has communication with no network and the UE exists as dead UE. Because the UE is not connected to any network, the network side cannot sense the presence of the UE, and therefore cannot perform network monitoring on the UE.

For example, the user equipment UE is a mobile phone. In this embodiment, the disconnected state of the mobile phone refers to that a mobile data connection function of the mobile phone is disabled, that is, an internet access function of 2G, 3G, 4G, and 5G mobile networks is disabled, but normal communication between the mobile phone and other data networks, for example, normal communication between the mobile phone and the base station side (a core network and a telephone network) is not disabled. Correspondingly, because the mobile phone is not disconnected from the telephone network on the base station side, data communication between the mobile phone and the telephone network is not affected. Therefore, the mobile phone may normally answer or make calls. However, if the mobile phone is completely disconnected, the mobile phone is disconnected from all communication networks (including the core network and the telephone network on the base station side and the like) in this scenario, and does not support communication between the mobile phone and the communication networks. In this case, a data transmission function of the mobile phone is completely disabled. For example, in this case, the mobile phone cannot answer or make calls.

4. An overall temperature of the UE is greater than or equal to a preset temperature threshold.

Regardless of whether the UE is in the screen-on state or the screen-off state, when the overall temperature of the UE is excessively high, for example, the overall temperature is greater than or equal to the preset temperature threshold, the UE is prone to crash or network disconnection, or even the UE may be burned out, and specifically a central processing unit (central processing unit, CPU) of the UE may be burned out. To reduce the overall temperature and protect the UE, the UE needs to automatically close a running application, for example, first close an application having high power consumption and a high network speed requirement such as a video application, and then close an application having low power consumption and a low network speed requirement such as a weather application or a calendar application. Therefore, when the UE detects that the overall temperature of the UE is excessively high, it may be considered that the UE currently already closes an application having a high network speed requirement, that is, already closes an application of a high network speed in the UE. In this case, the UE is in the application scenario of a low network speed.

A method for detecting the overall temperature of the UE is not limited. For example, when a temperature sensor is installed in the UE, the temperature sensor may be configured to detect and view the overall temperature of the UE. Alternatively, when no temperature sensor is installed in the UE, third-party software (a temperature measurement application such as Ludashi) installed in the UE may be configured to detect the overall temperature of the UE.

In an actual application, the overall temperature of the UE is a sum of temperatures of all components in the entire UE when the components are running. Because an obtained temperature of each component may have a particular error, the obtained overall temperature of the UE also has a large error, and accuracy or precision of the obtained temperature is low. Therefore, in an actual application, the overall temperature of the UE may usually be replaced by temperatures of some core components in the UE, such as a central processing unit CPU temperature, a system on chip (system on chip, SOC) temperature, and a battery temperature.

For example, the CPU is the most important hardware for the overall performance of the UE, and performance of the CPU directly affects the overall performance of the UE. Therefore, the CPU temperature is used as an important indicator of the overall temperature. For example, the overall temperature is the CPU temperature. The UE may enter a basic input/output system (basic input output system, BIOS) of the UE to obtain the CPU temperature, or the UE may run CPU temperature obtaining software (for example, a Python script file) to obtain the CPU temperature. This helps subsequently identify whether the application scenario of the UE is an application scenario of a high network speed or the application scenario of a low network speed based on the CPU temperature. Details are not described herein.

5. The UE is in a screen-off state and runs at a low network speed, that is, a data transmission rate of the UE is less than or equal to the preset rate.

In the screen-off state, the UE runs at a low network speed in a plurality of scenarios, and there may be the following two scenarios.

In the first scenario, in the screen-off state, the UE supports running of an application in the background, for example, playing music. To meet a network usage requirement of a low network speed, the UE may set an application function as follows: allowing running of an application of a low network speed, and prohibiting running of an application of a high network speed, that is, enabling a function of running an application of a low network speed, and disabling a function of running an application of a high network speed. It is understandable that after the function of running an application of a high network speed is disabled in the UE, only running of an application of a low network speed is allowed in the UE. Because a data transmission rate allowed in these applications of a low network speed is small, the UE may determine that the UE runs at a low network speed and is in the application scenario of a low network speed. Optionally, when a plurality of applications of a low network speed run in the UE at the same time, a sum of data transmission rates of the applications of a low network speed is also small, for example, is less than the preset rate, and a network usage requirement of a low network speed may also be met. In this case, it is still determined that the UE runs at a low network speed.

In the second scenario, the user equipment transmits or receives no data in the screen-off state, or only transmits a data packet such as a heartbeat test packet or a monitoring data packet for keeping an application program in an awake state. This type of data packet is received and sent periodically and a size of the data packet is small. In the foregoing case, it may be considered that the user equipment has a low requirement on a network parameter and the like and has a low network usage requirement, and it is considered that the UE runs at a low network speed, that is, is in the application scenario of a low network speed.

Optionally, after the UE enters the screen-off state, the data transmission rate of the UE usually becomes lower, for example, the data transmission rate is less than the preset rate. Therefore, when accuracy of identifying the application scenario of a low network speed is not considered, when the UE detects that the UE is in the screen-off state, it may be directly considered that the UE is in the application scenario of a low network speed.

6. The UE is in a screen-off state and a size of a data packet that needs to be transmitted by the UE is less than or equal to a second preset threshold.

In the screen-off state, the UE also receives and sends data. For example, the UE downloads data in the screen-off state, and transmits a heartbeat packet in the screen-off state. To satisfy a network usage requirement of a low network speed, the UE may not only consider the data transmission rate but also identify an amount of data that needs to be transmitted by the UE (that is, a size of a data packet that needs to be transmitted).

Specifically, when the UE is in the screen-off state, to meet a low network usage requirement in the application scenario of a low network speed, a size of a data packet that needs to be transmitted by the UE may be detected to determine whether the UE is in the application scenario of a low network speed. Specifically, when the size of the data packet that needs to be transmitted by the UE is less than a second preset size threshold, the UE may consider that communication load of the UE is high and the network usage requirement is high, and determine that the UE is not in the application scenario of a low network speed. In contrast, it is considered that the communication load of the UE is low and the network usage requirement is low, and it is determined that the UE is in the application scenario of a low network speed.

For example, the application scenario of a low network speed is an application scenario of exchanging a heartbeat packet. When the UE does not need to perform service communication, to maintain a communication connection between the UE and the network side, a heartbeat packet mechanism is usually used to maintain the connection between the UE and the network side. Specifically, the UE may periodically send the heartbeat packet to the network side to notify that the UE currently has a communication connection with the network side, to maintain a long connection between the UE and the network side. Correspondingly, after receiving the heartbeat packet, the network side may also return a response packet to the UE to notify that the network side knows that there is a communication connection between the UE and the network side. In an actual application, a size of the heartbeat packet is very small and is usually a few kilobits, or the heartbeat packet may be an empty packet (that is, a data packet that carries no service data and carries only a header). In this scenario, the UE is obviously in the application scenario of a low network speed.

Next, to solve problems such as network resource waste and high device power consumption in communication using an LTE-NR dual connectivity technology in an application scenario of a low network speed in conventional technologies, related embodiments of network connection processing in the embodiments of this application are described below.

Figure 5:
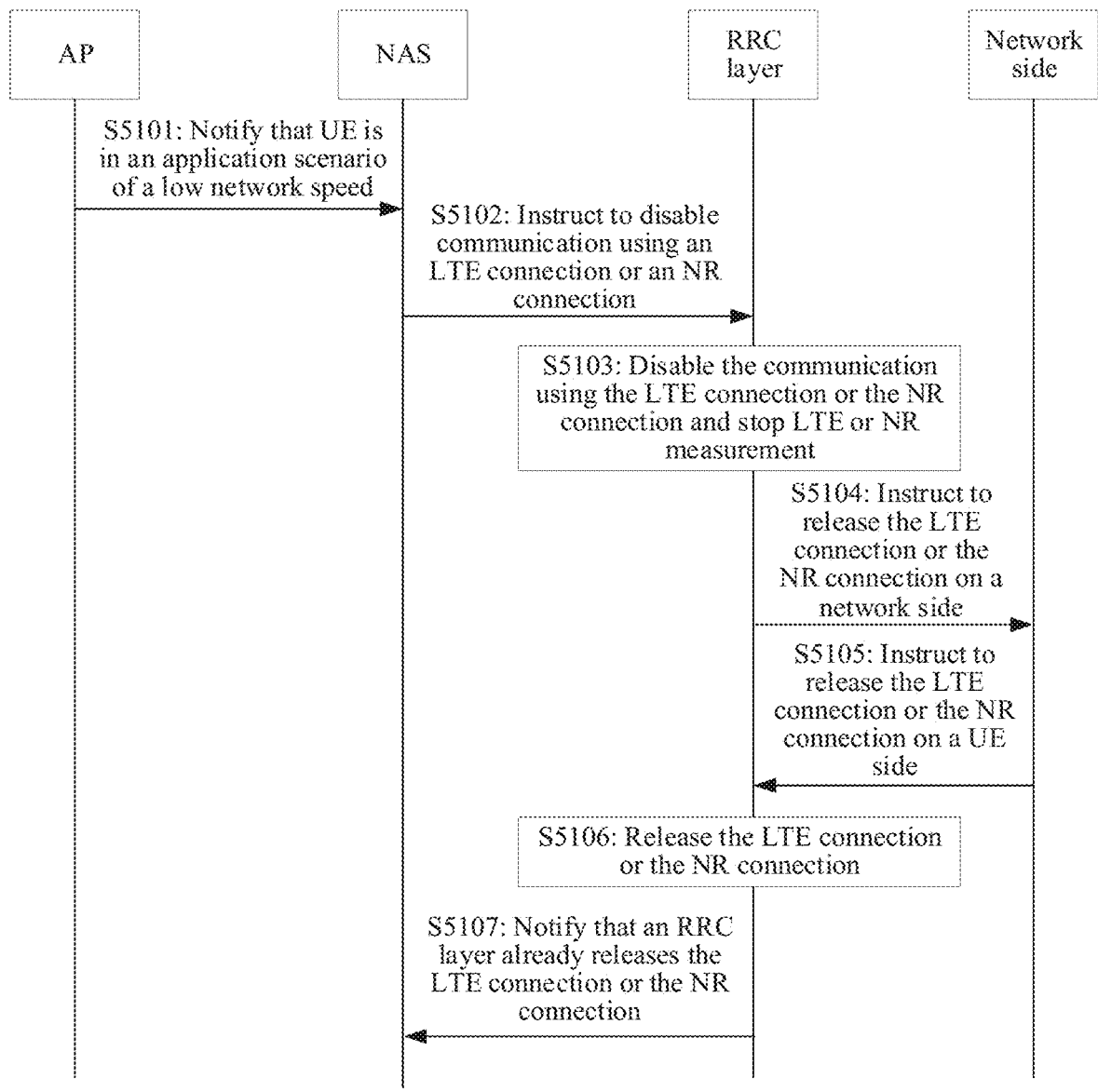
FIG. 5 is a schematic flowchart of a network connection processing method according to an embodiment of the present invention.

FIG. 5 is a schematic flowchart of a network connection processing method according to an embodiment of the present invention. The method shown in FIG. 5 includes the following implementation steps.

S5101: When detecting that user equipment UE is in an application scenario of a low network speed, an application processor (application processor, AP) of the UE sends a first signaling message to a non-access stratum NAS. The first signaling message is used for notifying that the UE is currently in the application scenario of a low network speed and a connection of an access network in LTE-NR dual connectivity may be released. Correspondingly, the NAS receives the first signaling message.

In this application, when the UE detects that the UE is in the application scenario of a low network speed, for example, the application processor AP detects that the UE is in the application scenario of a low network speed, the first signaling message may be sent to the NAS of the UE. The first signaling message is used for notifying that the UE is in the application scenario of a low network speed and a connection of any one of access networks in LTE-NR dual connectivity may be released. The first signaling message may also be referred to as a first notification message. This is not limited in the present invention. For a specific implementation in which the UE is in the application scenario of a low network speed, reference may be made to related descriptions in the foregoing embodiments. This is not described in detail again herein.

Specifically, the first signaling message may be a private command message, for example, an attention (attention, AT) command message; or a traditional command message, for example, a command message at^syscfgex used for disabling an NR connection communication function (that is, disabling a 5G communication function). When the first signaling message is the private command message, for example, the AT command message, the AP may send the AT command message to the NAS through an AT command interface, to release an LTE connection or an NR connection. In this case, the UE does not sense an access network used in communication of the UE. After the UE releases the LTE connection or the NR connection in LTE-NR dual connectivity, an icon displayed in an interface of the UE does not change. The user cannot learn, based on the displayed icon, of a connection of an access network used in current communication of the UE, and cannot learn whether currently the UE specifically releases the LTE connection or the NR connection in LTE-NR dual connectivity. The displayed icon is used for identifying a radio access network or a wireless connection communication technology, for example, LTE, NR, or LTE-NR, used in network connection and communication of the UE.

When the first signaling message is the traditional command message, the AP may send the traditional command message to the NAS to release the LTE connection or the NR connection. For example, the AP may send the command message at^syscfgex to the NAS, to disable the NR connection communication function and release the NR connection. In this case, after the UE releases the LTE connection or the NR connection in LTE-NR dual connectivity, the icon displayed in the interface of the UE changes. The user may learn, based on the displayed icon, of a connection of an access network used in current communication of the UE, that is, learn whether the UE specifically releases the LTE connection or the NR connection in LTE-NR dual connectivity.

Figure 6:
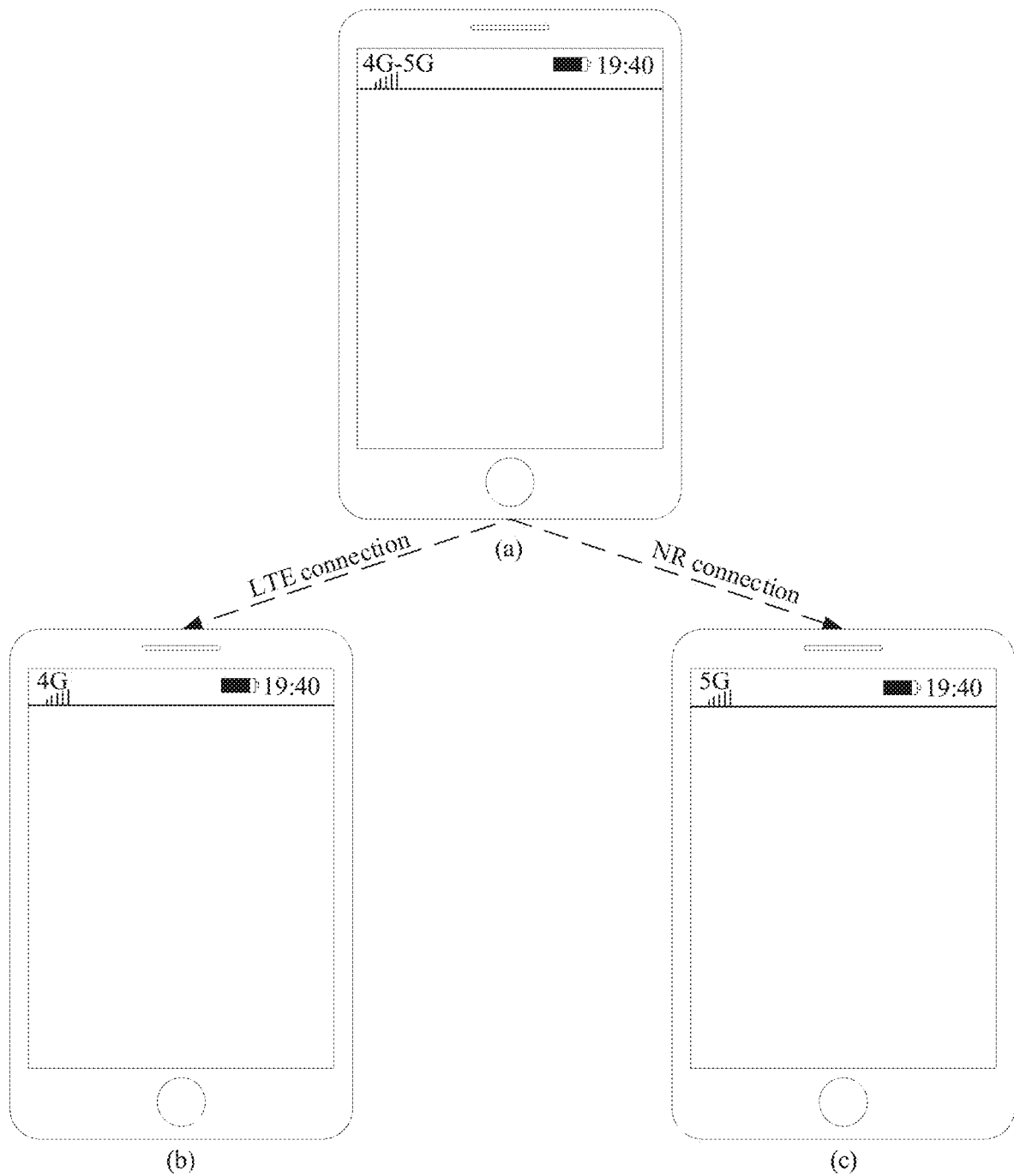
FIG. 6 is a schematic diagram of an interface in which a displayed icon changes according to an embodiment of the present invention.

In an actual application, the displayed icon may be specifically customized in a system, to distinguish between access networks connected to the UE. For example, when the UE uses 4G LTE in network connection and communication, the displayed icon may be characters "4G". For example, FIG. 6 is a schematic diagram of a possible change of an icon in switching of LTE-NR dual connectivity. As shown in FIG. 6, (a) of FIG. 6 shows that the UE connects to a network by using an LTE-NR dual connectivity technology to communicate with a 4G base station and a 5G base station on a network side. As shown in (a) of FIG. 6, an icon displayed to identify LTE-NR dual connectivity may be "4G-5G". In (b) of FIG. 6, after the UE releases the NR connection in LTE-NR dual connectivity, only the LTE connection is kept for network access to communicate with the 4G base station. Specifically, as shown in the figure, an icon displayed to identify the LTE connection may be "4G". In (c) of FIG. 6, the UE releases the LTE connection in LTE-NR dual connectivity, and keeps only the NR connection for network access to communicate with the 5G base station. As shown in the figure, an icon displayed to identify the NR connection may be "5G". The icons displayed in the three types of wireless connection communication technologies shown in FIG. 6 are only a possible example. This constitutes no limitation.

The first signaling message is used for instructing to release a connection of any one of access networks in LTE-NR dual connectivity, and the any access network may be an access network customized in a system of the UE. For example, according to an actual network usage requirement of the UE, a connection of an LTE access network or a connection of an NR access network used in communication between the UE and the network side is released, and is abbreviated as an LTE connection or an NR connection below. For example, when the current network usage requirement of the UE is high, for example, a size of a data packet that currently needs to be transmitted by the UE is greater than a preset second threshold and is less than or equal to a preset first threshold, the system may release the LTE connection by default. In contrast, when the current network usage requirement of the UE is not sufficiently high, for example, the size of the data packet that currently needs to be transmitted by the UE is less than or equal to a preset third threshold, the system may release the NR connection by default and keep the LTE connection, to satisfy a low network usage requirement of the UE. The preset first threshold, the preset second threshold, and the preset third threshold are all customized in the system. The preset second threshold is less than the preset first threshold, and the preset second threshold and the preset third threshold may be equal or not equal. This is not limited in this application.

In this application, the NR connection is a connection between the UE and the 5G base station, and the LTE connection is a connection between the UE and the 4G base station. Correspondingly, in this application, releasing the NR connection is releasing the connection between the UE and the 5G base station, and releasing the LTE connection is releasing the connection between the UE and the 4G base station.

S5102: The NAS sends a second signaling message to an RRC layer. The second signaling message is used for instructing the RRC layer not to support communication using an LTE connection or an NR connection. Correspondingly, the RRC layer receives the second signaling message.

After receiving the first signaling message, the NAS may send the second signaling message (which may also be a second notification message) to the RRC layer, to instruct the RRC layer currently not to support the communication using the LTE connection or the NR connection, that is, the RRC layer cannot use the LTE connection or the NR connection for data communication. Optionally, the second signaling message is further used for instructing the RRC layer to stop measurement of an LTE or NR access network, abbreviated as stopping LTE or NR measurement below.

In an actual application, the second signaling message includes at least one indication flag bit used for instructing the RRC layer to perform a corresponding functional operation. A form of the indication flag bit is not limited, for example, may be a character string, a numeric value, or an array. For example, when indication flag bits are "00", it means instructing the RRC layer not to support communication using LTE or NR dual connectivity; "01" means instructing the RRC layer to support communication using LTE or NR dual connectivity; "00" means instructing the RRC layer not to support communication using LTE or NR dual connectivity and disable a function of LTE or NR measurement; and "11" means instructing the RRC layer to support communication using LTE or NR dual connectivity and enable the function of LTE or NR measurement.

In a specific implementation, when detecting that the UE is in the application scenario of a low network speed, the AP of the UE may send the first signaling message to a wireless modem module of the UE, to instruct to release a connection of any one of access networks in LTE-NR dual connectivity. The modem module may be specifically a baseband processor (baseband processor, BP) deployed in the UE, and includes the NAS and the RRC layer. The AP and the BP are described in detail below in this application. Correspondingly, after the modem module receives the first signaling message, the NAS may send the second signaling message to the RRC layer to notify that the UE does not support the communication using the LTE connection or the NR connection and LTE or NR measurement is to be stopped.

Further optionally, the second signaling message may also be used for instructing the RRC layer to disable an uplink data transmission function of the UE and disable a function of reporting an LTE or NR measurement report, for example, prohibit the UE from sending data or an LTE or NR measurement report to the network side.

S5103: The RRC layer disables the communication using the LTE connection or the NR connection according to the instruction of the second signaling message.

Correspondingly, after receiving the second signaling message, the RRC layer may disable a communication function of either the LTE connection or the NR connection according to the instruction of the second signaling message. Optionally, the RRC layer may also stop LTE or NR measurement of the RRC layer, so that a report of the LTE or NR measurement, abbreviated as an LTE or NR measurement report, is not sent to a corresponding base station subsequently. That is, the RRC layer may disable the function of reporting the LTE or NR measurement report, so that the network side (which may be specifically a base station on the network side) cannot receive the LTE or NR measurement report sent by the UE.

The LTE or NR measurement is specifically used for measuring signal quality of a communication link (that is, an LTE or NR link) of an LTE or NR access network, and the LTE or NR measurement is also LTE or NR link measurement. In some possible embodiments of this application, "LTE" and "LTE link" may be used interchangeably without constituting a limitation, and "NR" and "NR link" may be used interchangeably without constituting a limitation. Correspondingly, the LTE or NR measurement report may include but is not limited to a measurement identifier ID and a measurement result of a communication link (an LTE or NR link) of an access network, for example, information about downlink reference signal received power (reference signal received power, RSRP) and downlink reference signal received quality (reference signal received quality, RSRQ).

S5104: The RRC layer sends a third signaling message to the network (network, NW) side. The third signaling message is used for instructing a network side to release a radio resource occupied on the network side when the LTE connection or the NR connection is configured, to release the LTE connection or the NR connection on the network side. Correspondingly, the network side NW receives the third signaling message.

After receiving the second signaling message, the RRC layer may send the third signaling message to the network side through an access network that is not disconnected. The third signaling message is used for instructing the network side to release the radio resource (or a network resource) occupied by the LTE connection or the NR connection on the network side, to release the LTE connection or the NR connection on the network side, that is, release, on the network side, the connection between the UE and the 4G base station or the 5G base station on the network side.

Specifically, during releasing of the NR connection, the RRC layer may send the third signaling message to the network side through an LTE access network, to instruct to release a radio resource occupied on the network side when the NR connection is configured, to release the NR connection on the network side, that is, release the connection between the UE and the 5G base station on the network side.

In an actual application, the third signaling message may be an SCG link failure message, and is specifically used for releasing the radio resource occupied by the NR connection on the network side, for example, a radio resource related to each functional layer (such as NR PDCP, NR RLC, NR MAC, and NR PHY) included in an SCG link used in the communication using the NR connection. For example, a radio resource related to NR PHY is released. Specifically, information such as a downlink receiving channel, a frequency, and a cell identifier ID may be released.

In different protocol versions of 5G, specific implementations of the SCG link failure message may be different. For example, in the R12 standard protocol, the SCG link failure message may be specifically a signaling message SCGFailureInformation-r12-IEs and includes parameters customized in the protocol such as a failure type failureType-r12. The failure type is used as an example. The failure type may specifically include any one or a combination of the following parameters: a timer delay (that is, a data transmission delay supported on a UE side and the network side), a random access problem randomAccessProblem, an RLC maximum number of retransmissions rlc-MaxNumRetx (an allowed maximum number of RLC data packet retransmissions), an SCG link change failure scg-ChangeFailure (that is, switching of an SCG link is not supported), and the like. This is not limited in this application.

Correspondingly, during releasing of the LTE connection, the RRC layer may send the third signaling message to the network side through the NR access network, to specifically release a radio resource occupied by the LTE connection on the network side, for example, a radio resource related to each functional layer (such as LTE PDCP, LTE RLC, LTE MAC, and LTE PHY) included in an MCG link used in the communication using the LTE connection. In different protocol versions, specific implementations of the third signaling message are not limited. Correspondingly, after receiving the third signaling message, the network side may release, according to the instruction of the third signaling message, the radio resource occupied by the LTE connection on the network side, for example, release information such as a downlink receiving channel, a frequency, and a cell identifier ID, to release the LTE connection on the network side, that is, release the connection between the UE and the 4G base station.

Optionally, the third signaling message may also be used for notifying that the UE (which may be specifically the RRC layer of the UE) already stops the LTE or NR measurement and disables the function of reporting the LTE or NR measurement report. Correspondingly, the network side cannot receive the LTE or NR measurement report sent by the UE side.

S5105: The network side sends a fourth signaling message to the RRC layer. The fourth signaling message is used for instructing the RRC layer to release a radio resource occupied on a UE side when the LTE connection or the NR connection is configured, to release the LTE connection or the NR connection on the UE side. Correspondingly, the RRC layer receives the fourth signaling message.

S5106: The RRC layer releases the LTE connection or the NR connection on the UE side according to the instruction of the fourth signaling message.

After releasing the LTE connection or the NR connection on the network side, the network side may send the fourth signaling message to the RRC layer to instruct the RRC layer to release the radio resource occupied on the UE side when the LTE connection or the NR connection is configured, to release the LTE connection or the NR connection on the UE side, that is, release, on the UE side, the connection between the UE and the 4G base station or the 5G base station on the network side.

In an actual application, the fourth signaling message may be specifically a first RRC reconfiguration message, used for instructing the RRC layer to release the radio resource, also referred to as resource configuration information, occupied on the UE side when the LTE connection or the NR connection is configured or established. Specifically, for example, the NR connection is released. The first RRC reconfiguration message carries a release releast field, and is used for instructing the RRC layer to release the radio resource occupied on the UE side when the NR connection is configured, for example, release a radio resource related to a functional transfer layer such as NR PDCP, NR RLC, NR MAC, and NR PHY. Specifically, a configuration parameter, for example, a frequency and a cell identifier, that is related when the NR connection is configured on the network side may be released.

In an actual application, when the LTE access network can meet the network usage requirement of the UE in the application scenario of a low network speed, the UE and the network side preferentially release the NR connection to switch LTE-NR dual connectivity to the connection of the LTE access network, to implement data communication through a single LTE connection. This can avoid problems such as network resource waste and high device power consumption in dual connectivity, and help save a network resource and improve network utilization efficiency.

For example, the NR connection is released. After the RRC layer receives the fourth signaling message (that is, an RRC reconfiguration message) sent by the network side, because the RRC layer of the UE specifically includes LTE RRC (abbreviated as LRRC) and NR RRC (abbreviated as NRRC), the fourth signaling message is specifically used for instructing an NRRC layer to release the radio resource occupied by the NR connection on the UE side, and not to release a radio resource related to an LRRC layer. Specifically, the network side may send the fourth signaling message to the LRRC and the LRRC forwards the fourth signaling message to NRRC, to release the NR connection on the UE side in response to the fourth signaling message; or the network side directly sends the fourth signaling message to the LRRC layer, so that the NRRC controls to release the radio resource occupied on the UE side when the NR connection is configured.

Optionally, in response to the first RRC reconfiguration message, the RRC layer may send a corresponding RRC configuration response message to the network side, to notify that the RRC layer already releases the LTE connection or the NR connection on the UE side.

S5107: The RRC layer may send a fifth signaling message to the NAS. The fifth signaling message is used for notifying the NAS that the LTE connection or the NR connection on the UE side is already released.

After releasing the LTE connection or the NR connection on the UE side, the RRC layer may send the fifth signaling message to the NAS. The fifth signaling message is used for notifying the NAS that the radio resource occupied by the LTE connection or the NR connection on the UE side is already released, that is, the LTE connection or the NR connection on the UE side is released. That is, the UE and the network side may no longer communicate with each other through the released LTE or NR connection. The fifth signaling message may also be referred to as a third notification message, to correspondingly notify that the LTE connection or the NR connection on the UE side is already released.

In an actual application, the fifth signaling message also includes at least one indication flag bit, used for instructing the NAS to perform a corresponding functional operation. For details of the indication flag bit, reference may be made to related descriptions in the foregoing embodiments. This is not described in detail again herein. For example, the fifth signaling message carries an indication flag bit "0", used for indicating or notifying that the RRC layer already releases the LTE connection on the UE side. The fifth signaling message carries an indication flag bit "1", used for indicating or notifying that the RRC layer already releases the NR connection on the UE side. This is not limited in this application.

Figure 7:
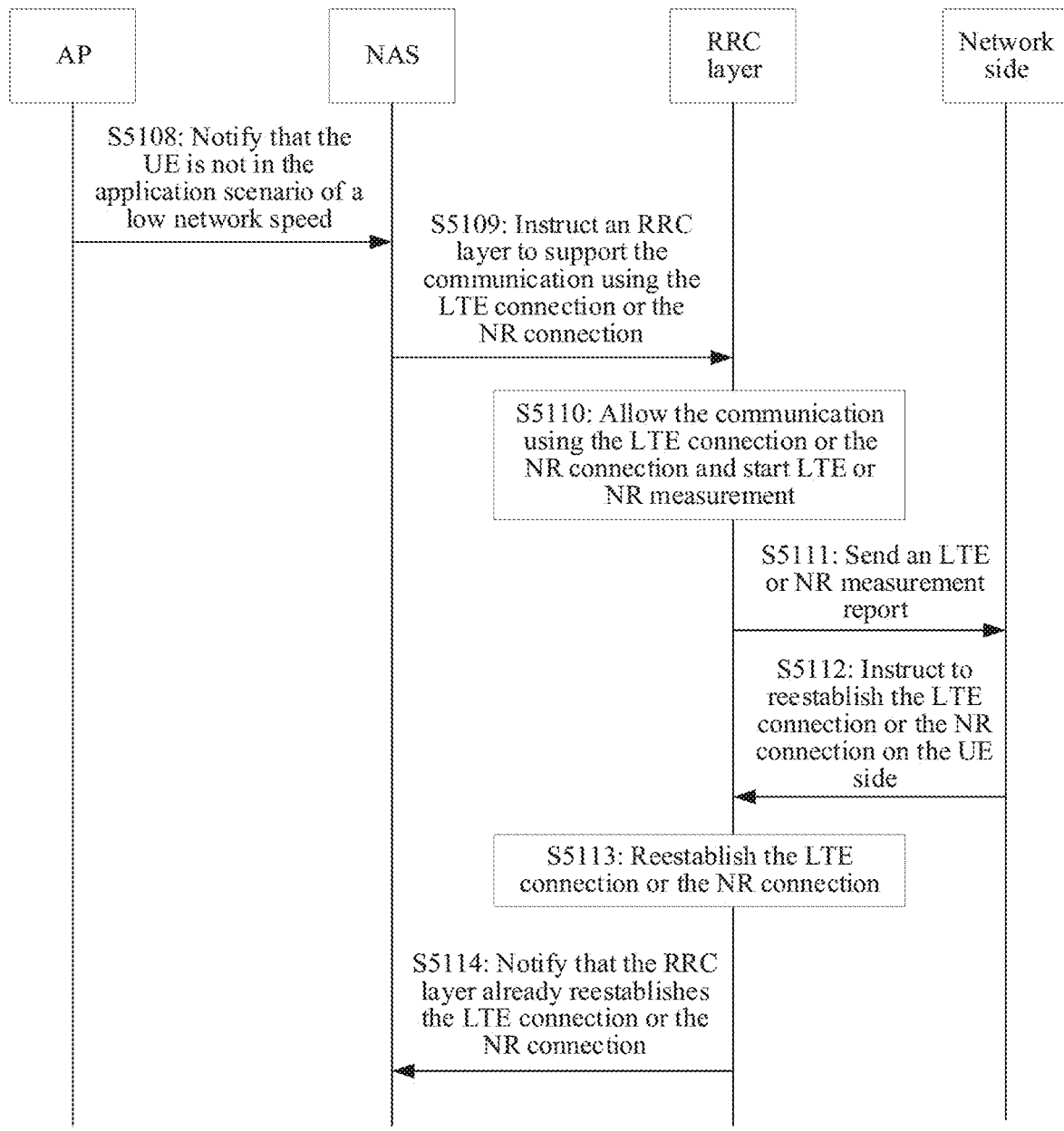
FIG. 7 to FIG. 9 are schematic flowcharts of other network connection processing methods according to embodiments of the present invention.

After the UE releases a communication connection of any one of access networks in LTE-NR dual connectivity, if the UE is no longer in the application scenario of a low network speed (for example, switches from the application scenario of a low network speed to an application scenario of a high network speed), the UE may restore communication of LTE-NR dual connectivity by using steps in a procedure of a method in FIG. 7. As shown in FIG. 7, the method includes the following implementation steps.

S5108: After detecting that the UE is not in the application scenario of a low network speed, the AP of the UE sends a sixth signaling message to the NAS. The sixth signaling message is used for notifying that the UE is not in the application scenario of a low network speed and the connection of the any one of the access networks (the LTE or NR access network) that is already released needs to be reestablished or restored. Correspondingly, the NAS receives the sixth signaling message.

In this application, there are a plurality of specific implementations in which the UE is not in the application scenario of a low network speed. For example, if the AP of the UE detects that the UE does not meet the foregoing condition for determining the application scenario of a low network speed, it may be determined that the UE is not in the application scenario of a low network speed, or it is directly considered that the UE is in the application scenario of a high network speed. For example, when the condition for determining that the UE is in the application scenario of a low network speed is that the UE is in the screen-off state and the data transmission rate of the UE is less than or equal to a preset threshold, after the AP of the UE detects that the UE switches from the screen-off state to a screen-on state, that is, the UE is in the screen-on state, it may be considered that the UE is not in the application scenario of a low network speed.

Further, the AP of the UE may send the sixth signaling message to the NAS. The sixth signaling message is used for notifying that the UE is currently not in the application scenario of a low network speed and the connection of any one of the access networks in LTE-NR dual connectivity that is already released needs to be restored, that is, the corresponding LTE or NR connection that is disconnected in FIG. 5 needs to be restored. In an actual application, the fifth signaling message may also be referred to as a fourth notification message, and is used for notifying that the UE is not in the application scenario of a low network speed, or is specifically used for notifying a condition for determining that the UE is not in the application scenario of a low network speed, for example, notifying that the UE is in the screen-on state.

Specifically, the sixth signaling message may also be a private command message, for example, an AT command message; or a traditional command message, for example, a command message at^syscfgex used for enabling the NR connection and communication function (that is, reestablishing the NR connection). When the sixth signaling message is the AT command message, the AP also sends the AT command message to the NAS through an AT command interface, to reestablish the LTE connection or the NR connection. In this case, the UE does not sense an access network used in communication of the UE, and an icon displayed in an interface of the UE does not change.

In contrast, when the sixth signaling message is a traditional signaling message, the AP sends the traditional signaling message to the NAS to reestablish the LTE connection or the NR connection. For example, a command message at^syscfgex may be used for reestablishing the NR connection and restarting or restoring the NR connection and communication function, that is, restoring the 5G communication function. In this case, the icon displayed in the interface of the UE changes, and the user may observe the displayed icon, to learn of an access network or a wireless connection and communication technology used by the UE for current communication, for example, LTE-NR.

It should be noted that in both the private command message and the traditional command message, an indication flag bit may be used for instructing to release or reestablish the LTE/NR connection. Alternatively, the UE may instruct, by using different command messages (that is, signaling messages), to release the LTE/NR connection and reestablish the LTE/NR connection. For example, when the private command message or the traditional command message carries indication flag bits "030201", the private command message or the traditional command message is used for instructing to release the NR connection. In contrast, when the private command message or the traditional command message carries indication flag bits "08030201", the private command message or the traditional command message is used for instructing to reestablish or restore the NR connection. Alternatively, when the private command message or the traditional command message is a CLOSE command message, the private command message or the traditional command message is used for instructing to release the NR connection. In contrast, when the private command message or the traditional command message is an OPEN command message, the private command message or the traditional command message is used for instructing to reestablish the NR connection.

S5109: The NAS sends a seventh signaling message to the RRC layer. The seventh signaling message is used for instructing the RRC layer to support the communication using the LTE connection or the NR connection and start LTE or NR measurement. Correspondingly, the RRC layer receives the seventh signaling message.

S5110: The RRC layer allows the communication using the LTE connection or the NR connection and starts LTE or NR measurement according to the instruction of the seventh signaling message.

In an actual application, the seventh signaling message may also be referred to as a fifth notification message, and includes at least one indication flag bit used for instructing the RRC layer to perform a corresponding functional operation, for example, instructing the RRC layer to restore the communication using the LTE connection or the NR connection and restart LTE or NR measurement. For steps S5108 to S5110, reference may be correspondingly made to descriptions of related content of steps S5101 to S5103 in FIG. 5, and details are not repeated herein.

S5111: The RRC layer interacts with the network side to instruct to reconfigure the LTE connection or the NR connection on the network side. For example, when detecting an LTE or NR cell, the RRC layer sends an LTE or NR measurement report to the network side. Correspondingly, the network side receives the LTE or NR measurement report.

In this application, the RRC layer may send a sixth notification message (or a signaling message) to the network side, to instruct the network side to reconfigure a radio resource that needs to be occupied by the LTE connection or the NR connection on the network side, to reestablish the LTE connection or the NR connection on the network side. In an actual application, the sixth notification message may be specifically an LTE or NR measurement report. After starting LTE or NR measurement, the RRC layer may perform cell measurement of the UE and report a corresponding measurement report. Specifically, in this application, when detecting an LTE or NR cell, the RRC layer may send the LTE or NR measurement report to the network side (which is specifically a 4G base station or a 5G base station on the network side). Correspondingly, after receiving the measurement report, the network side may learn that the UE and the network side support the LTE connection or the NR connection. The network side may reconfigure the radio resource that needs to be occupied by the LTE connection or the NR connection on the network side, for example, reconfigure a radio resource that is related to a functional transfer layer such as NR PDCP, NR RLC, NR MAC, and NR PHY and needs to be used by the LTE connection or the NR connection for communication on the network side, to reestablish the LTE connection or the NR connection on the network side.

S5112: The network side sends an eighth signaling message to the RRC layer. The eighth signaling message is used for instructing the RRC layer to reestablish the LTE connection or the NR connection on the UE side. Correspondingly, the RRC layer receives the eighth signaling message.

Further, the network side may send the eighth signaling message to the RRC layer, to instruct the RRC layer to reestablish the LTE connection or the NR connection on the UE side. In an actual application, the eighth signaling message may be specifically a second RRC reconfiguration message, used for instructing the RRC layer to reconfigure the radio resource that needs to be occupied by the LTE connection or the NR connection on the UE side. Specifically, reestablishment of the NR connection is used as an example. The second RRC reconfiguration message carries a configuration field spCellConfig. The field includes an NR configuration parameter. The NR configuration parameter is specifically a parameter related to a radio resource that needs to be occupied by the NR connection on the UE side, for example, a radio resource configuration parameter related to a functional transfer layer such as NR PDCP, NR RLC, NR MAC, and NR PHY. Specifically, when the NR PHY is reconfigured, the NR configuration parameter includes a parameter such as a downlink receiving channel, a frequency, and a cell identifier ID.

S5113: The RRC layer reestablishes the LTE connection or the NR connection on the UE side according to the instruction of the eighth signaling message.

After receiving the eighth signaling message (which may be specifically the second RRC reconfiguration message) sent by the network side, the RRC layer may reconfigure, according to the instruction of the eighth signaling message, a radio resource that needs to be occupied on the UE side when the LTE connection or the NR connection is configured, to reestablish the LTE connection or the NR connection on the UE side. Reestablishment of the NR connection is used as an example. The RRC layer may reconfigure, according to the instruction of the second RRC reconfiguration message, a radio resource that is related to a functional transfer layer such as NR PDCP, NR RLC, NR MAC, and NR PHY and needs to be occupied by the NR connection on the UE side, to reestablish the NR connection on the UE side. In this way, the UE may subsequently use the NR connection to communicate with the network side (which may be specifically the 5G base station on the network side).

Optionally, after reestablishing the LTE connection or the NR connection on the UE side in response to the second RRC reconfiguration message, the RRC layer may send a corresponding RRC reconfiguration response message to the network side, to notify that the RRC layer already reestablishes the LTE connection or the NR connection on the UE side.

S5114: The RRC layer sends a ninth signaling message to the NAS. The ninth signaling message is used for notifying that the RRC layer already reestablishes the LTE connection or the NR connection on the UE side.

After reestablishing the LTE connection or the NR connection on the UE side, the RRC layer may send the ninth signaling message (which may also be specifically referred to as a fourth notification message) to the NAS, to notify that the RRC layer already reestablishes the LTE connection or the NR connection on the UE side. Subsequently, the UE and the network side may communicate by using LTE-NR dual connectivity.

In an implementation of the embodiments of the present invention, a signaling message may be used to interact with the network side in the application scenario of a low network speed, any one (such as an LTE or NR access network) of access networks in LTE-NR dual connectivity is released, and the function of reporting the LTE or NR measurement report is disabled. This can reduce additional power consumption of communication using the LTE connection or the NR connection, thereby reducing device power consumption and improving network utilization efficiency.

Figure 8:
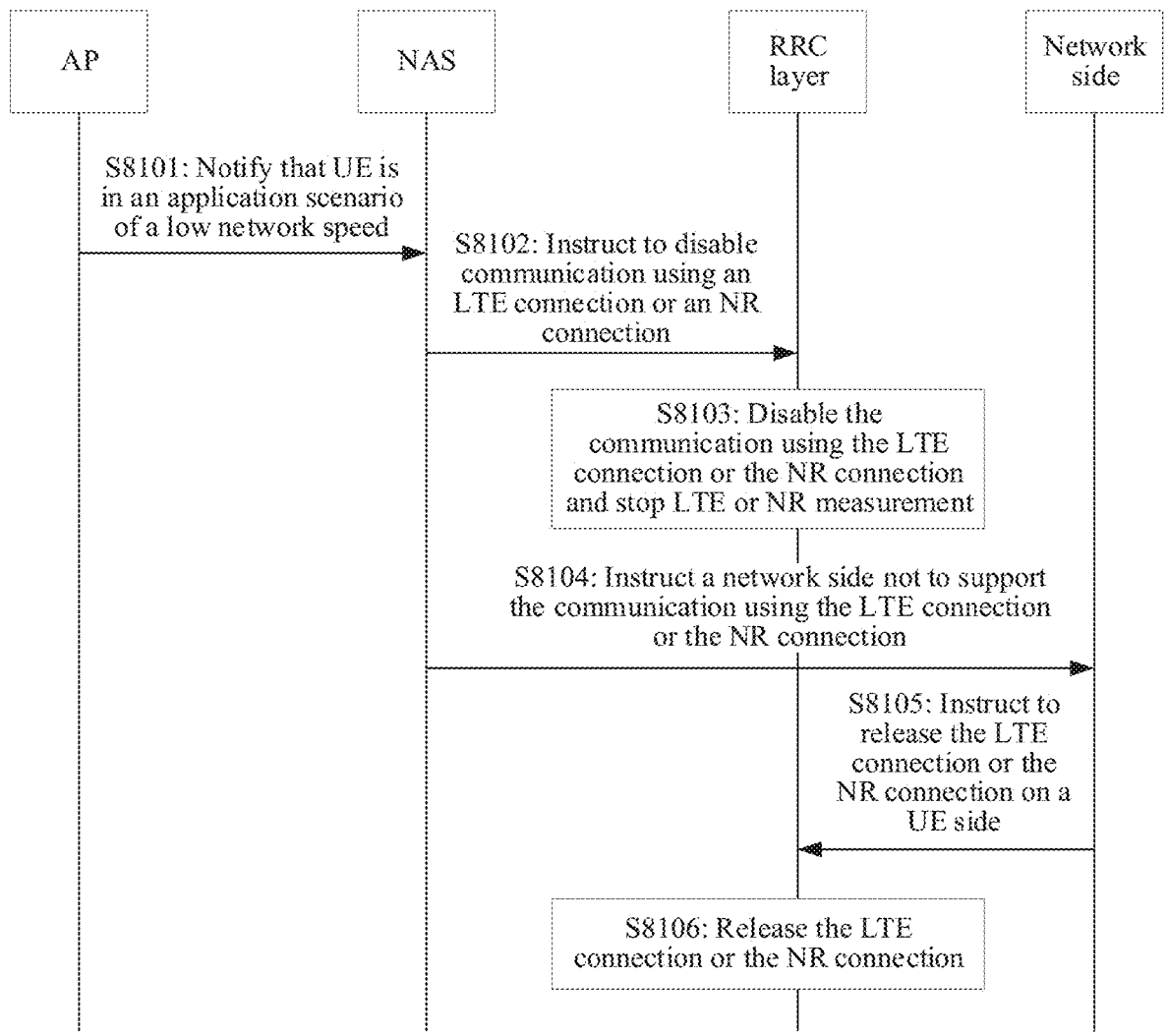

FIG. 8 is a schematic flowchart of another network connection processing method according to an embodiment of the present invention. As shown in FIG. 8, the method includes the following implementation steps.

S8101: When detecting that the UE is in an application scenario of a low network speed, an AP of the UE sends a tenth signaling message to a NAS of the UE. The tenth signaling message is used for notifying that the UE is in the application scenario of a low network speed and a connection of any one of access networks in LTE-NR dual connectivity may be released. Correspondingly, the NAS receives the tenth signaling message.

S8102: The NAS sends an eleventh signaling message to the RRC layer. The eleventh signaling message is used for instructing the RRC layer not to support communication using an LTE connection or an NR connection and stop LTE or NR measurement. Correspondingly, the RRC layer receives the eleventh signaling message.

S8103: The RRC layer disables the communication using the LTE connection or the NR connection and stops LTE or NR measurement according to the instruction of the eleventh signaling message. For steps S8101 to S8103, reference may be correspondingly made to related descriptions of steps S5101 to S5103, and details are not repeated herein.

S8104: The NAS sends a twelfth signaling message to a network side, to instruct the network side not to support the communication using the LTE connection or the NR connection. Correspondingly, the network side receives the twelfth signaling message.

In this application, after determining, according to the tenth signaling message, that the LTE connection or the NR connection needs to be released, the NAS may send the twelfth signaling message to the network side (which may be specifically a base station on the network side), to correspondingly instruct the 4G/5G base station on the network side not to support the communication using the LTE connection or the NR connection. Correspondingly, after receiving the twelfth signaling message, the network side may release a radio resource occupied by the LTE connection or the NR connection on the network side. For example, during releasing of the NR connection, after receiving the twelfth signaling message, the 5G base station on the network side may release the radio resource occupied by the NR connection on the network side. Specifically, the 5G base station may release a radio resource related to a functional transfer layer such as NR PDCP, NR RLC, NR MAC, and NR PHY, to release the NR connection on the network side, that is, release a connection between the UE and the 5G base station. In another example, during releasing of the LTE connection, after receiving the twelfth signaling message, a 4G base station on the network side may release a radio resource occupied by the LTE connection on the network side. Specifically, the 4G base station may release a radio resource related to a functional transfer layer such as LTE PDCP, LTE RLC, LTE MAC, and LTE PHY, to release the LTE connection on the network side, that is, release a connection between the UE and the 4G base station.

In an actual application, the twelfth signaling message may be specifically a first tracking area update (tracking area update, TAU) message. A first TAU message carries a parameter customized in a system, to instruct the network side not to support a communication function of the LTE connection or the NR connection. For example, the first TAU message carries an indication parameter, and the indication parameter is used for instructing whether to currently support the NR connection in LTE-NR dual connectivity. In an actual application, the indication parameter may be represented by a specified character, a specified numeric value, or a specified character string. For example, when the indication parameter is "1", it means that the communication function of the NR connection is currently supported. In contrast, when the indication parameter is "0", it means that the communication function of the NR connection is not currently supported.

S8105: The network side sends a thirteenth signaling message to the RRC layer. The thirteenth signaling message is used for instructing the RRC layer to release the LTE connection or the NR connection on a UE side. Correspondingly, the RRC layer receives the thirteenth signaling message.

S8106: The RRC layer releases the LTE connection or the NR connection on the UE side according to the instruction of the thirteenth signaling message.

In an actual application, the thirteenth signaling message may be specifically an RRC reestablishment message, and is used for instructing the RRC layer to release the radio resource occupied on the UE side when the LTE connection or the NR connection is configured, to release the LTE connection or the NR connection on the UE side. Optionally, after releasing the LTE connection or the NR connection of the UE, the RRC layer may also send a signaling message to the NAS, to notify that the RRC layer already releases the LTE connection or the NR connection of the UE. For steps S8105 and S8106, reference may be correspondingly made to detailed descriptions of related content of S5105 and S5106 in FIG. 5, and details are not repeated herein. For content not described in this embodiment of this application, reference may be correspondingly made to related detailed descriptions in the embodiment in FIG. 5, and details are not repeated herein.

Figure 9:
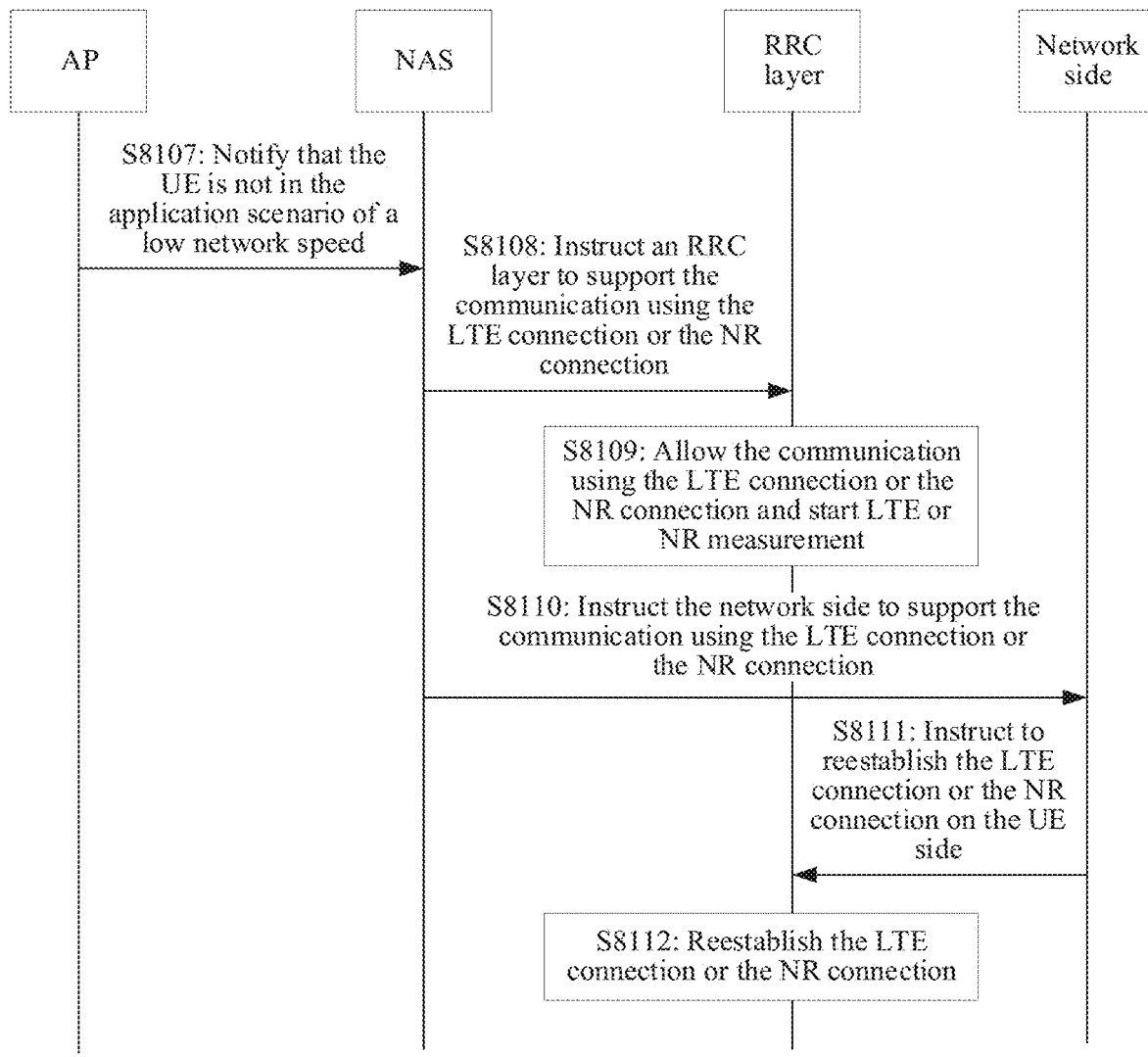

Optionally, after the UE releases a communication connection of any one of access networks in LTE-NR dual connectivity, if the UE is no longer in the application scenario of a low network speed, the UE may restore communication of LTE-NR dual connectivity between the UE and the network side by using steps in a procedure of a method in FIG. 9. As shown in FIG. 9, the method may specifically include the following implementation steps.

S8107: When detecting that the UE is not in the application scenario of a low network speed, the AP of the UE sends a fourteenth signaling message to the NAS. The fourteenth signaling message is used for notifying that the UE is not in the application scenario of a low network speed and a connection of any one of access networks that is already released needs to be reestablished or restored (that is, the LTE connection or the NR connection is restored). Correspondingly, the NAS receives the fourteenth signaling message.

S8108: The NAS sends a fifteenth signaling message to the RRC layer. The fifteenth signaling message is used for instructing the RRC layer to support the communication using the LTE connection or the NR connection and start LTE or NR measurement. Correspondingly, the RRC layer receives the fifteenth signaling message.

S8109: The RRC layer disables the communication using the LTE connection or the NR connection and stops LTE or NR measurement according to the instruction of the fifteenth signaling message. For steps S8107 to S8109, reference may be correspondingly made to descriptions of related content of S5108 to S5110 in FIG. 7, and details are not repeated herein.

S8110: The NAS sends a sixteenth signaling message to the network side. The sixteenth signaling message is used for instructing the network side to support the communication using the LTE connection or the NR connection. Correspondingly, the network side receives the sixteenth signaling message.

In an actual application, the sixteenth signaling message may be specifically a second TAU message, and the second TAU message is used for instructing the network side to currently support the communication function of the LTE connection or the NR connection, that is, the UE and the network side may communicate with each other by using the LTE connection or the NR connection. Correspondingly, after receiving the second TAU message, the network side may learn that the network side supports the LTE connection or the NR connection. Further, the network side may reconfigure the radio resource that needs to be occupied by the LTE connection or the NR connection on the network side, for example, reconfigure a radio resource that is related to a functional transfer layer such as NR PDCP, NR RLC, NR MAC, and NR PHY and needs to be used by the LTE connection or the NR connection for communication on the network side, to reestablish the LTE connection or the NR connection on the network side.

S8111: The network side sends a seventeenth signaling message to the RRC layer. The seventeenth signaling message is used for instructing the RRC layer to reestablish the LTE connection or the NR connection on the UE side. Correspondingly, the RRC layer receives the seventeenth signaling message.

S8112: The RRC layer reestablishes the LTE connection or the NR connection on the UE side according to the instruction of the seventeenth signaling message.

In an actual application, the seventeenth signaling message may be specifically an RRC reconfiguration message, and is used for instructing the RRC layer to reconfigure the radio resource that needs to be occupied by the LTE connection or the NR connection on the UE side, to reconfigure the LTE connection or the NR connection on the UE side. For content not described in this embodiment of this application, reference may be correspondingly made to related detailed descriptions in the embodiment in FIG. 7, and details are not repeated herein.

In an implementation of the embodiments of the present invention, a TAU message may be used to negotiate and interact with the network side in the application scenario of a low network speed, and a communication function of any one (such as an LTE or NR access network) of access networks in LTE-NR dual connectivity is disabled. This can reduce device power consumption and improve network utilization efficiency.

Figure 10:
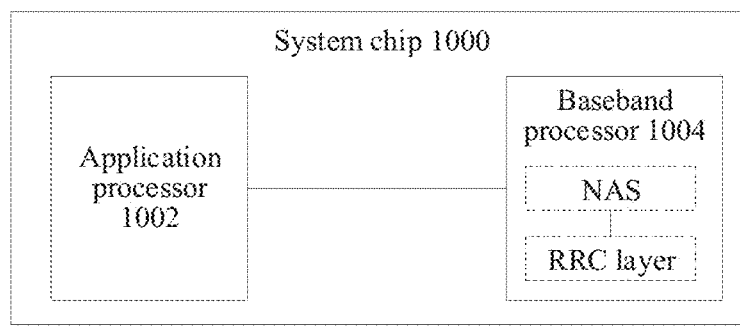
FIG. 10 is a schematic structural diagram of a system chip according to an embodiment of the present invention.

Based on related descriptions of the embodiments in FIG. 1 to FIG. 9, the following describes related products, for example, a chip, a transceiver unit, an apparatus, and a device, that are applicable to this application. FIG. 10 is a schematic structural diagram of a system chip according to an embodiment of the present invention. A system chip 1000 shown in FIG. 10 includes an application processor (application processor, AP) 1002 and a baseband processor 1004 (baseband processor, BP).

The application processor is short for a multimedia application processor (multimedia application processor, MAP), and is an ultra-large scale integrated circuit that expands audio and video functions and dedicated interfaces based on a central processing unit CPU with low power consumption. The application processor is mainly classified into three types: a comprehensive processor, a multimedia processor, and a single media processor. The comprehensive processor not only has a function of the multimedia application processor, but also may run a complex operating system similar to Linux. The multimedia processor is a processor that processes more than two types of media, for example, images, sound, videos, and 3D graphics. The single media processor is a processor that processes one medium and is usually only configured to process images or sound.

The baseband processor is an important component in the system chip, is equivalent to a protocol processor, is responsible for data processing and storage, and mainly includes units such as a digital signal processor (digital signal processor, DSP), a microcontroller unit (micro controller unit, MCU), and a memory (such as a flash or a flash memory). Correspondingly, the baseband processor is mainly responsible for baseband encoding or decoding, sound encoding, voice encoding, and the like. Currently, the baseband processor not only supports a plurality of communication standards (for example, GSM, LTE, and CDMA), but also provides a multimedia function and provides a communications interface related to a multimedia display, an image sensor, and an audio device.

In an actual application, the application processor AP supports running of software, where the software usually includes an operating system, a user interface, an application program, and the like. The baseband processor BP may be considered as a wireless modem module, responsible for coordinating and controlling communication between the BP and a base station and communication between the BP and the AP. The baseband processor supports running of software, where the software includes communication and control software of a baseband modem and the like.

The application processor AP and the baseband processor BP may communicate with each other by using a preset interface technology. The interface technology may be customized in a system, for example, includes but is not limited to a serial peripheral interface (serial peripheral interface, SPI), universal asynchronous receiver/transmitter (universal asynchronous receiver/transmitter, UART), universal serial bus (universal serial bus, USB), general purpose input/output (general purpose input/output, GPIO), and the like. Specifically, the application processor and the baseband processor may communicate with each other in a message format of a control command, to perform functions such as a call, an SMS message, and mobile network access. The control command may include a conventional AT (attention) command, a mobile broadband interface model (mobile broadband interface model, MBIM) command, or other protocol commands supporting transmission between the AP and the BP.

Optionally, as shown in FIG. 10, the baseband processor BP supports running of protocol software related to a non-access stratum NAS and a radio resource control RRC layer. In an actual application, the application processor AP supports communication with the NAS and the RRC layer in the baseband processor BP. For example, the application processor AP in this application may send a corresponding signaling message to the NAS by using a conventional AT command, to notify the NAS of information such as an application status or a device screen status currently learned of by the AP.

Optionally, the NAS in the baseband processor BP supports implementation of method steps performed by the NAS in any one of the method embodiments in FIG. 5 to FIG. 9, and/or other technical content described in this specification. The RRC layer in the baseband processor BP supports implementation of method steps performed by the RRC layer in any one of the method embodiments in FIG. 5 to FIG. 9, and/or other technical content described in this specification.

In an actual application, the system chip 1000 is usually a highly complex system chip, for example, an SOC chip. In actual deployment, the system chip 1000 may be deployed inside a device, or may be deployed outside a device and control the device through a wired connection or a wireless connection. The device includes but is not limited to user equipment UE or a terminal device, for example, may specifically include a smartphone, a mobile Internet device (mobile Internet device, MID), a wearable smart device, or another device that supports communication with a network. Specifically, when the system chip 1000 is deployed inside the user equipment, the system chip 1000 is directly configured to implement the method in any one of the method embodiments in FIG. 5 to FIG. 9. When the system chip 1000 is deployed outside the user equipment, establishment of communication between the system chip 1000 and the user equipment through a wired connection or a wireless connection is supported, and the user equipment invokes or controls the system chip 1000 to implement the method described in any one of the method embodiments in FIG. 5 to FIG. 9.

In an implementation of this embodiment of the present invention, this may solve problems such as high device power consumption and network resource waste in communication using an LTE-NR dual connectivity technology in a scenario of a low network speed in conventional technologies.

Figure 11:
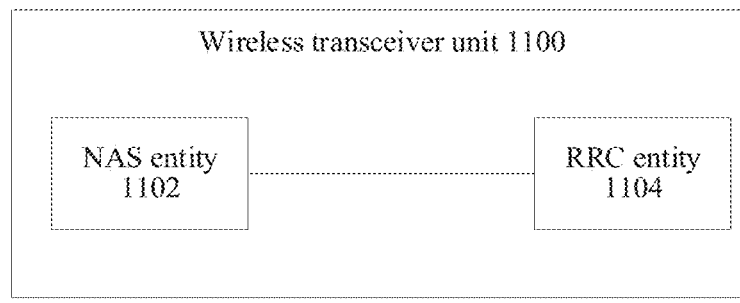
FIG. 11 is a schematic structural diagram of a wireless transceiver unit according to an embodiment of the present invention.

Referring to FIG. 11, an embodiment of the present invention provides a wireless transceiver unit 1100, including a non-access stratum NAS entity 1102 and a radio resource control RRC entity 1104. The NAS entity 1102 is configured to perform related steps performed by the NAS in any one of the method embodiments in FIG. 5 to FIG. 9, or technical content described in this specification. The RRC entity 1104 is configured to perform related steps performed by the RRC layer in any one of the method embodiments in FIG. 5 to FIG. 9, or technical content described in this specification.

For example, the NAS entity 1102 is configured to: after receiving a first notification message sent by an application side of the user equipment UE, send an NR disconnection message to the RRC entity. The first notification message is used for notifying that the UE in a screen-off state and a size of a data packet that needs to be received or sent by the UE is less than or equal to a first threshold. The NR disconnection message is used for instructing the RRC entity to release a radio resource occupied on a UE side when an NR connection is configured, to release the NR connection on the UE side.

The RRC entity 1104 is configured to release, according to the instruction of the NR disconnection message, the radio resource occupied on the UE side when the NR connection is configured, to release the NR connection on the UE side.

In some possible embodiments, the RRC entity 1104 is further configured to send a secondary cell group SCG link failure message to a network side. The SCG link failure message is used for instructing to release a radio resource of an SCG link that is occupied by the NR connection on the network side, to release the NR connection on the network side. The UE and the network side establish mutual communication of the NR connection through the SCG link.

In some possible embodiments, the RRC entity 1104 is further configured to send a second notification message to the NAS entity. The second notification message is used for notifying that the NR connection on the UE side is already released.

In some possible embodiments, the RRC entity 1104 is further configured to send a first tracking area update TAU message to the network side. The first TAU message is used for instructing the network side not to support communication of the NR connection.

In some possible embodiments, the NAS entity 1102 is further configured to: after receiving a third notification message sent by the application side of the UE, send an NR reestablishment message to the RRC entity. The third notification message is used for notifying that the UE in a screen-on state. The NR reestablishment message is used for instructing the RRC entity to reconfigure a radio resource that needs to be occupied by the NR connection on the UE side, to reestablish the NR connection on the UE side.

The RRC entity 1104 is further configured to reconfigure, according to the instruction of the NR reestablishment message, the radio resource that needs to be occupied by the NR connection on the UE side, to reestablish the NR connection on the UE side.

In some possible embodiments, the RRC entity 1104 is further configured to send a fourth notification message to the NAS entity. The fourth notification message is used for notifying that the NR connection on the UE side is already reestablished.

In some possible embodiments, the RRC entity 1104 is further configured to send a secondary cell group SCG link success message to the network side. The secondary cell group SCG link success message is used for instructing to reconfigure a radio resource of an SCG link that is occupied by the NR connection on the network side, to reestablish the NR connection on the network side.

In some possible embodiments, the NAS entity 1102 is further configured to send a second tracking area update TAU message to the network side. The second TAU message is used for instructing the network side to support communication of the NR connection.

Figure 12:
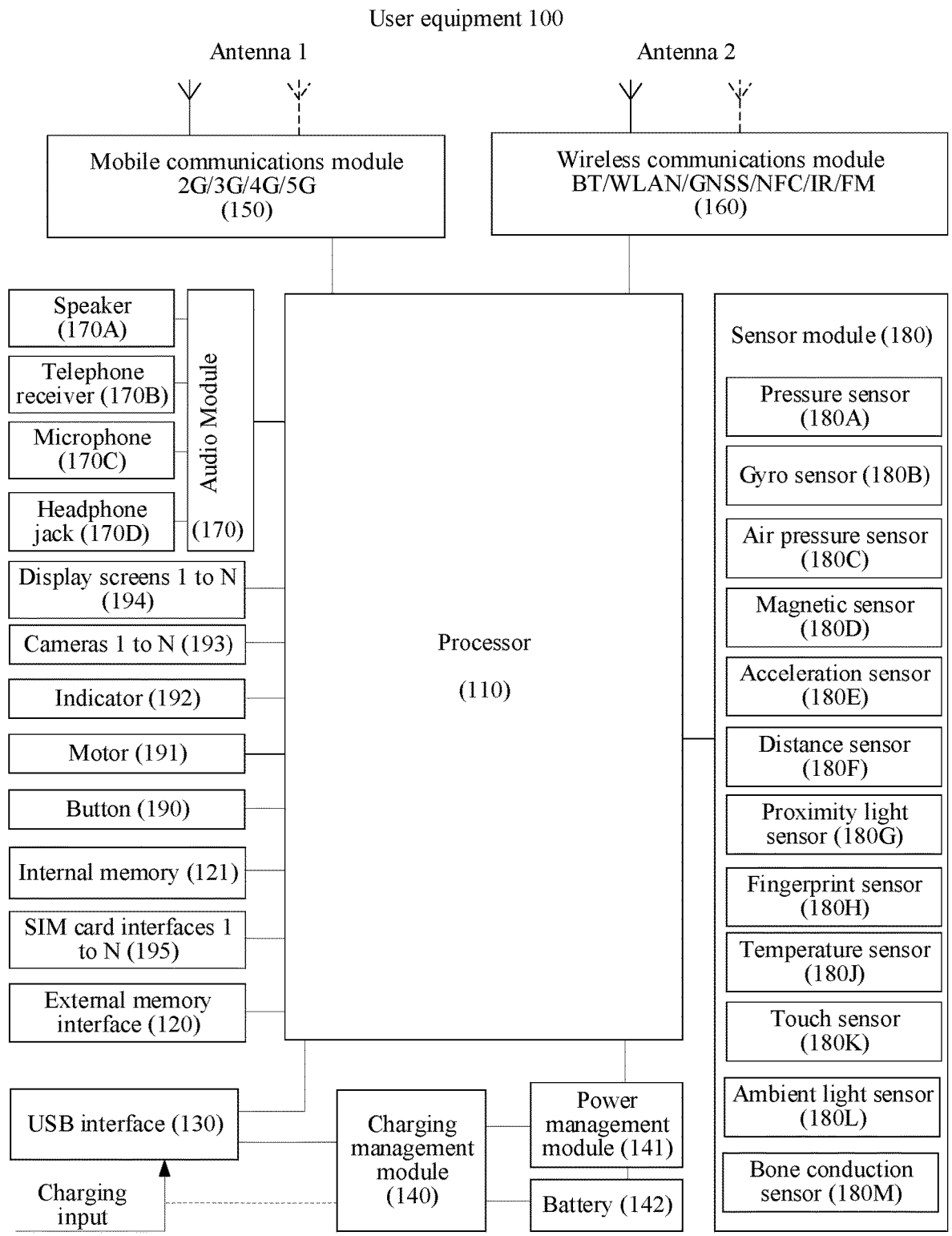
FIG. 12 is a schematic structural diagram of user equipment according to an embodiment of the present invention.

FIG. 12 is a schematic structural diagram of possible UE. The UE 100 may also be referred to as a network connection processing apparatus. The UE 100 shown in FIG. 12 may include a processor 110, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, and an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in this embodiment of the present invention does not constitute a specific limitation on the UE 100. In some other embodiments of this application, the UE 100 may include more or fewer components than those shown in the figure, or some components may be combined, or some components may be split, or components are arranged in different manners. The components shown in the figure may be implemented by hardware, software, or a combination of software and hardware.

The processor 110 may include one or more processing units. For example, the processor 110 may include an application processor (application processor, AP), a baseband processor (which may also be referred to as a modem processor), a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the user equipment 100. The controller may generate an operation control signal according to instruction operation code and a time-sequence signal, and control obtaining and executing of instructions.

A memory may also be disposed in the processor 110, configured to store instructions and data. In some embodiments, the memory in the processor 110 is a cache. The memory may store instructions or data recently used or cyclically used by the processor 110. If the processor 110 needs to use the instructions or the data again, the instructions or the data may be invoked directly from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

The I2C interface is a bidirectional synchronous serial bus and includes a serial data line (serial data line, SDA) and a serial clock line (serial clock line, SCL). In some embodiments, the processor 110 may include a plurality of I2C buses. The processor 110 may be coupled to the touch sensor 180K, a charger, a flash, the camera 193, and the like through different I2C bus interfaces. For example, the processor 110 may be coupled to the touch sensor 180K through the I2C interface, so that the processor 110 and the touch sensor 180K communicate with each other through the I2C bus interface, to perform a touch function of the user equipment 100.

The I2S interface may be configured to perform audio communication. In some embodiments, the processor 110 may include a plurality of groups of I2S buses. The processor 110 may be coupled to the audio module 170 through the I2S bus to implement communication between the processor 110 and the audio module 170. In some embodiments, the audio module 170 may transmit an audio signal to the wireless communications module 160 through the I2S interface, to perform a function of answering a call through a Bluetooth headset.

The PCM interface may also be configured to perform audio communication, to sample, quantize, and encode an analog signal. In some embodiments, the audio module 170 may be coupled to the wireless communications module 160 through a PCM bus interface. In some embodiments, the audio module 170 may also transfer an audio signal to the wireless communications module 160 through the PCM interface, to perform the function of answering a call through the Bluetooth headset. Both the I2S interface and the PCM interface may be configured to perform audio communication.

The UART interface is a universal serial data bus and is configured to perform asynchronous communication. The bus may be a bidirectional communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to perform a Bluetooth function. In some embodiments, the audio module 170 may transfer an audio signal to the wireless communications module 160 through the UART interface, to perform a function of playing music through the Bluetooth headset.

The MIPI may be configured to connect the processor 110 to a peripheral device such as the display screen 194 or the camera 193. The MIPI includes a camera serial interface (camera serial interface, CSI), a display serial interface (display serial interface, DSI), and the like. In some embodiments, the processor 110 and the camera 193 communicate with each other through the CSI to perform a photographing function of the user equipment 100. The processor 110 and the display screen 194 communicate with each other through the DSI to perform a display function of the user equipment 100.

The GPIO interface may be configured through software. The GPIO interface may be configured as a control signal or a data signal. In some embodiments, the GPIO interface may be configured to connect the processor 110 to the camera 193, the display screen 194, the wireless communications module 160, the audio module 170, the sensor module 180, and the like. The GPIO interface may also be configured as an I2C interface, an I2S interface, a UART interface, a MIPI, and the like.

The USB interface 130 is an interface that complies with the USB standard specification, and may be specifically a Mini USB interface, a Micro USB interface, a USB Type C interface, and the like. The USB interface 130 may be configured to connect to a charger to charge the user equipment 100, and may also be configured to transfer data between the user equipment 100 and peripheral devices. The USB interface 130 may also be configured to connect to a headset to play audio through the headset. The interface may also be configured to connect to another electronic device such as an AR device.

It may be understood that an interface connection relationship between modules in this embodiment of the present invention is merely an example for description, and does not constitute a structural limitation on the user equipment 100.

In some other embodiments of this application, the user equipment 100 may also use different interface connection manners in the foregoing embodiments, or a combination of a plurality of interface connection manners.

The charging management module 140 is configured to receive charging input from the charger. The charger may be a wireless charger or a wired charger. In some embodiments of wired charging, the charging management module 140 may receive charging input of the wired charger through the USB interface 130. In some embodiments of wireless charging, the charging management module 140 may receive wireless charging input through a wireless charging coil of the user equipment 100. While the charging management module 140 charges the battery 142, a power management module 141 may also supply power to the electronic device.

The power management module 141 is configured to connect to the battery 142, the charging management module 140, and the processor 110. The power management module 141 receives input from the battery 142 and/or the charging management module 140, and supplies power to the processor 110, the internal memory 121, the external memory, the display screen 194, the camera 193, the wireless communications module 160, and the like. The power management module 141 may also be configured to monitor parameters such as a battery capacity, a quantity of battery cycles, and a battery health status (power leakage and impedance). In some other embodiments, the power management module 141 may also be disposed in the processor 110. In some other embodiments, the power management module 141 and the charging management module 140 may also be disposed in a same device.

A wireless communication function of the UE 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna of the UE 100 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communications module 150 may provide a solution to wireless communication such as 2G/3G/4G/5G applied to the UE 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some functional modules of the mobile communication module 150 may be configured in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the loudspeaker 170A, the telephone receiver 170B, and the like), or displays an image or a video through the display screen 194. In some embodiments, the modem processor may be an independent device. In some other embodiments, the modem processor may be independent of the processor 110, and the modem processor and the mobile communications module 150 or another function module may be disposed in a same component.

The wireless communications module 160 may provide a solution to wireless communication applied to the UE 100, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components into which at least one communication processing module is integrated. The wireless communication module 160 receives an electromagnetic wave by using the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, the antenna 1 and the mobile communications module 150 of the UE 100 are coupled, and the antenna 2 and the wireless communications module 160 of the UE 100 are coupled, so that the UE 100 can communicate with a network and another device by using a wireless communications technology. The wireless communications technology may include an LTE-NR dual connectivity technology, an LTE single connectivity technology, and the like. For example, The wireless communications technology may specifically include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (Beidou navigation satellite system, BDS), a quasi-zenith satellite system (quasi-zenith satellite system, QZSS), and/or a satellite based augmentation system (satellite based augmentation systems, SBAS).

The UE 100 implements a display function by using the GPU, the display screen 194, the application processor, and the like. The GPU is a microprocessor for image processing, and is connected to the display screen 194 and the application processor. The GPU is configured to perform mathematical and geometric calculations and to render graphics. The processor 110 may include one or more GPUs and execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a Micro LED, a Micro-OLED, quantum dot light emitting diodes (quantum dot light emitting diodes, QLED), and the like. In some embodiments, the UE 100 may include one or N display screens 194. N is a positive integer greater than 1.

The UE 100 can implement a photographing function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may also optimize noise point, brightness, and skin tone algorithms. The ISP may also optimize parameters such as exposure and color temperature of a photographed scene. In some embodiments, the ISP may be disposed in the camera 193.

The camera 193 is configured to capture a static image or a video. An optical image of an object is generated through a lens and is projected to the photosensitive element. The light-sensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the UE 100 may include one or N cameras 193, and N is a positive integer greater than 1.

The digital signal processor is configured to process a digital signal, and in addition to a digital image signal, may further process another digital signal. For example, when the UE 100 performs frequency selection, the digital signal processor is configured to perform Fourier transform and the like on frequency energy.

The video codec is configured to compress or decompress a digital video. The UE 100 may support one or more video codecs. In this way, the UE 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the UE 100, for example, image recognition, facial recognition, voice recognition, and text understanding.

The external memory interface 120 may be configured to connect to an external storage card such as a micro SD card, to expand a storage capability of the UE 100. The external storage card communicates with the processor 110 by using the external memory interface 120, so as to implement a data storage function, such as storing a file such as music or a video in the external storage card.

The internal memory 121 may be configured to store computer executable program code, and the executable program code includes an instruction. The processor 110 runs the instruction stored in the internal memory 121, to perform various function applications and data processing of the UE 100. The internal memory 121 may include a program storage region and a data storage region. The program storage region may store an operating system, an application required by at least one function (for example, a voice playing function or an image playing function), and the like. The data storage region may store data (for example, audio data and an address book) and the like created when the UE 100 is used. In addition, the internal memory 121 may include a high-speed random access memory, or may include a non-volatile memory such as at least one magnetic disk memory, a flash memory, or a universal flash storage (universal flash storage, UFS).

The UE 100 may implement an audio function such as music playing or recording by using the audio module 170, the loudspeaker 170A, the telephone receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The UE 100 may be used to listen to music or answer a call in a hands-free mode by using the loudspeaker 170A.

The telephone receiver 170B, also referred to as a "receiver", is configured to convert an audio electrical signal into a sound signal. When the UE 100 is used to answer a call or receive voice information, the telephone receiver 170B may be put close to a human ear, to receive the voice information.

The microphone 170C, also referred to as a "microphone" or a "microphone", is configured to convert a sound signal into an electrical signal. When making a call or sending voice information, a user may speak with the mouth approaching the microphone 170C, to input a sound signal to the microphone 170C. At least one microphone 170C may be disposed in the UE 100. In some other embodiments, two microphones 170C may be disposed in the UE 100, to collect a sound signal and implement a noise reduction function. In some other embodiments, three, four, or more microphones 170C may be alternatively disposed in the UE 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates having conductive materials. When force is exerted on the pressure sensor 180A, capacitance between electrodes changes. The UE 100 determines strength of pressure based on a change of the capacitance. When a touch operation is performed on the display screen 194, the UE 100 detects strength of the touch operation by using the pressure sensor 180A. The UE 100 may further calculate a position of the touch based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the UE 100. In some embodiments, an angular velocity of the UE 100 around three axes (i.e., x, y, and z axes) may be determined through the gyroscope sensor 180B. The gyroscope sensor 180B may be used for image stabilization during photographing. For example, when the shutter is pressed, the gyro sensor 180B detects an angle at which the UE 100 jitters, and calculates, based on the angle, a distance for which a lens module needs to compensate, and allows the lens to cancel the jitter of the UE 100 through reverse motion, thereby implementing image stabilization. The gyro sensor 180B may also be used in navigation and a motion sensing game scenario.

The barometric pressure sensor 180C is configured to measure barometric pressure. In some embodiments, the UE 100 calculates an altitude by using a barometric pressure value measured by the barometric pressure sensor 180C, to assist in positioning and navigation.

The magnetic sensor 180D includes a Hall effect sensor. The UE 100 may detect opening and closing of a flip leather case by using the magnetic sensor 180D. In some embodiments, when the UE 100 is a clamshell phone, the UE 100 may detect opening and closing of a flip cover based on the magnetic sensor 180D. Further, based on a detected opening or closing state of the leather case or a detected opening or closing state of the flip cover, a feature such as automatic unlocking of the flip cover is set.

The acceleration sensor 180E may detect an acceleration value of the UE 100 in each direction (generally three axes). When the head-mounted UE 100 is stationary, a magnitude and a direction of a gravity may be detected. The acceleration sensor may be further configured to recognize a posture of the electronic device, and is applied to applications such as switching between landscape and portrait modes and a pedometer.

The distance sensor 180F is configured to measure a distance. The UE 100 may measure a distance through infrared or laser. In some embodiments, in a photographing scenario, the UE 100 may measure a distance by using the distance sensor 180F, to implement quick focusing.

The optical proximity sensor 180G may include, for example, a light-emitting diode (LED) and an optical detector such as a photodiode. The light emitting diode may be an infrared light emitting diode. The UE 100 may emit infrared light by using the light-emitting diode. The UE 100 detects infrared reflected light from a nearby object by using the photodiode. When detecting sufficient reflected light, the UE 100 may determine that there is an object near the UE 100. When detecting sufficient reflected light, the UE 100 may determine that there is an object near the UE 100. The UE 100 may detect, by using the optical proximity sensor 180G, that a user holds the UE 100 close to an ear for a call, so that automatic screen-off is implemented to achieve power saving. The optical proximity sensor 180G may be further configured to automatically unlock and lock the screen in a leather cover mode and a pocket mode.

The ambient light sensor 180L is configured to sense luminance of ambient light. The UE 100 may adaptively adjust a luminance of the display screen 194 according to perceived brightness of the ambient light. The ambient light sensor 180L may be further configured to automatically adjust white balance during photo taking. The ambient light sensor 180L may further cooperate with the optical proximity sensor 180G to detect whether the UE 100 is in a pocket, so as to prevent an accidental touch.

The fingerprint sensor 180H is configured to collect a fingerprint. The UE 100 may implement fingerprint unlock, application lock accessing, fingerprint photographing, fingerprint-based call answering, and the like by using a feature of the collected fingerprint.

The temperature sensor 180J is configured to detect a temperature. In some embodiments, the UE 100 executes a temperature processing policy by using the temperature detected by the temperature sensor 180J. For example, when the temperature reported by the temperature sensor 180J exceeds a threshold, the UE 100 reduces performance of a processor near the temperature sensor 180J, to reduce power consumption and implement heat protection. In some other embodiments, when the temperature is lower than another threshold, the UE 100 heats the battery 142, to avoid an abnormal shutdown of the UE 100 caused by a low temperature. In some other embodiments, when the temperature is lower than still another threshold, the UE 100 boosts an output voltage of the battery 142, to avoid an abnormal shutdown caused by a low temperature.

The touch sensor 180K is also referred to as a "touch panel". The touch sensor 180K may be disposed on the display screen 194. The touch sensor 180K and the display screen 194 form a touchscreen, which is also referred to as a "touchscreen". The touch sensor 180K is configured to detect a touch operation performed on or near the touch sensor 180K. The touch sensor may transmit the detected touch operation to the application processor, to determine a touch event type. The touch sensor 180K may provide a visual output related to the touch operation by using the display screen 194. In some other embodiments, the touch sensor 180K may be alternatively disposed on a surface of the UE 100, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may alternatively contact a human pulse, and receive a blood pressure beating signal. In some embodiments, the bone conduction sensor 180M may be alternatively disposed in a headset, to form a bone conduction headset. The audio module 170 may obtain a voice signal through parsing based on the vibration signal, of the vibration bone of the vocal-cord part, that is obtained by the bone conduction sensor 180M, to implement a voice function. The application processor may parse heart rate information based on the blood pressure pulse signal obtained by the bone conduction sensor 180M, to implement a heart rate detection function.

The key 190 includes a power key, a volume key, and the like. The key 190 may be a mechanical key, or a touch-type key. The UE 100 may receive a key input, and generate a key signal input related to user setting and function control of the UE 100.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different regions of the display screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, may be configured to indicate a charging state and a battery change, and may be further configured to indicate a message, a missed call, a notification, and the like.

The SIM card interface 195 is configured to connect to a SIM card. The SIM card may be inserted into the SIM card interface 195 or plugged from the SIM card interface 195, to come into contact with or be separated from the UE 100. The UE 100 may support one or N SIM card interfaces. N is a positive integer greater than 1. The SIM card interface 195 can support a nano SIM card, a micro SIM card, a SIM card, and the like. A plurality of cards may all be inserted into the same SIM card interface 195. The plurality of cards may be of a same type or different types. The SIM card interface 195 may further be compatible with different types of SIM cards. The SIM card interface 195 may also be compatible with an external memory card. The UE 100 interacts with a network by using a SIM card, to implement functions such as a call and data communication. In some embodiments, the UE 100 uses an eSIM, that is, an embedded SIM card. The eSIM card may be embedded in the UE 100 and cannot be separated from the UE 100.

The embodiments of the present invention further provide a chip system, the chip system includes at least one processor, a memory, and an interface circuit, the memory, the transceiver, and the at least one processor are connected each other by using a line, and the at least one memory stores instructions; and when the instructions are executed by the processor, the flowchart of any method embodiment in FIG. 5 to FIG. 9 can be implemented.

The embodiments of the present invention further provide a computer-readable storage medium. The computer-readable storage medium stores instructions, the instructions, when run on a computer, causing to implement the flowchart of any method embodiment in FIG. 5 to FIG. 9.

The embodiments of the present invention further provide a computer program product. When the computer program product runs on a processor, the flowchart of any method embodiment in FIG. 5 to FIG. 9 can be implemented.

In combination with the embodiments disclosed herein, steps of the method or algorithm described may be implemented by using hardware, or a software instruction executed by a processor. The software instruction may be formed by a corresponding software module, and the software module may be stored in a random access memory (RAM), a flash memory, a read-only memory (ROM), an erasable programmable ROM (EPROM), an electrically erasable programmable ROM (EEPROM), a register, a hard disk, a removable magnetic disk, a CD-ROM, or any storage medium of other forms well-known in the technical field. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a computing device. Certainly, the processor and the storage medium may be used as discrete assemblies existing in a computing device.

A person of ordinary skill in the art may understand that all or some of the processes of the methods in the embodiments may be implemented by a computer program instructing relevant hardware. The program may be stored in a computer-readable storage medium. When the program is executed, the procedures of the foregoing method embodiments are performed. The foregoing storage medium includes: a medium such as a ROM, a RAM, a magnetic disk, or an optical disc that can store program code.

What is claimed is:

1. A method, comprising:
   establishing, by a UE, a dual connection to a 4G base station and a 5G base station by using dual connectivity technology of a radio access network;
   in response to determining that the UE satisfies a preset condition, sending, by the UE, a secondary cell group (SCG) link failure message to the 4G base station or the 5G base station for releasing a connection between the UE and the 4G base station or the 5G base station based on the SCG link failure message;
   wherein the preset condition comprising at least one of:
     the UE is in a screen-on state and a data transmission rate of the UE is less than or equal to a first preset rate;
     the UE is in a screen-on state and a size of a data packet that needs to be transmitted by the UE is less than or equal to a first preset threshold;
     a mobile data connection function of the UE is disabled;
     an overall temperature of the UE is greater than or equal to a preset temperature threshold;
     the UE is in a screen-off state a data transmission rate of the UE is less than or equal to a second preset rate; or
     the UE is in a screen-off state and a size of a data packet that needs to be transmitted by the UE is less than or equal to a second preset threshold.

2. The method of claim 1, wherein the method further comprises:
   after the connection between the UE and the 4G base station or the 5G base station is released, reestablishing the connection between the UE and the 4G base station or the 5G base station in response to determining that the preset condition is not met by the UE.

3. The method of claim 1, wherein data transmission rate of the UE comprising a downlink data transmission rate of the UE.

4. The method of claim 1, wherein
the UE does not send an LTE or NR measure report to the 4G base station or the 5G base station after the connection between the UE and the 4G base station or the 5G base station is released.

5. The method of claim 1, wherein an icon displayed in an interface of the UE does not change after the connection between the UE and the 4G base station or the 5G base station is released,
wherein the icon indicates the wireless radio access network or wireless connection communication technology adopted by the UE during communication.

6. The method of claim 1, wherein sending the SCG link failure message to the 4G base station or the 5G base station comprises:
sending the SCG link failure message to the 5G base station to cause the 5G base station to instruct releasing the connection between the UE and the 4G base station, or
sending, the SCG link failure message to the 4G base station to cause the 4G base station to instruct releasing the connection between the UE and the 5G base station.

7. An apparatus, comprising:
a non-transitory memory comprising instructions; and
at least one processor coupled to the non-transitory memory, the instructions being executed by the at least one processor to cause UE to:
establish a dual connection to a 4G base station and a 5G base station by using dual connectivity technology of a radio access network;
in response to determining that the UE satisfies a preset condition, send a secondary cell group (SCG) link failure message to the 4G base station or the 5G base station for releasing a connection between the UE and the 4G base station or the 5G base station based on the SCG link failure message;
wherein the preset condition comprising at least one of:
the UE is in a screen-on state and a data transmission rate of the UE is less than or equal to a first preset rate;
the UE is in a screen-on state and a size of a data packet that needs to be transmitted by the UE is less than or equal to a first preset threshold;
a mobile data connection function of the UE is disabled;
an overall temperature of the UE is greater than or equal to a preset temperature threshold;
the UE is in a screen-off state a data transmission rate of the UE is less than or equal to a second preset rate; or
the UE is in a screen-off state and a size of a data packet that needs to be transmitted by the UE is less than or equal to a second preset threshold.

8. The apparatus of claim 7, wherein the instructions are for execution by the at least one processor to cause the UE to:
after the connection between the UE and the 4G base station or the 5G base station is released, reestablish the connection between the UE and the 4G base station or the 5G base station in response to determining that the preset condition is not met by the UE.

9. The apparatus of claim 7, wherein data transmission rate of the UE comprising a downlink data transmission rate of the UE.

10. The apparatus of claim 7, wherein
the UE does not send an LTE or NR measure report to the 4G base station or the 5G base station after the connection between the UE and the 4G base station or the 5G base station is released.

11. The apparatus of claim 7, wherein an icon displayed in an interface of the UE does not change after the connection between the UE and the 4G base station or the 5G base station is released,
wherein the icon is used to indicates the wireless radio access network or wireless connection communication technology adopted by the UE during communication.

12. The apparatus of claim 7, wherein the instructions being executed are for execution by the at least one processor to cause the UE to:
after the connection between the UE and the 4G base station or the 5G base station is released, send an LTE or NR measure report to the 4G base station or the 5G base station when the UE does not satisfy the preset condition.

13. The apparatus of claim 12, wherein the instructions are for execution by the at least one processor to cause the UE to:
receive a signaling message from the 4G base station or the 5G base station after sending an LTE or NR measure report to the 4G base station or the 5G base station, wherein the signaling message is an RRC reconfiguration message for reestablishing the connection between the UE and the 4G base station or the 5G base station.

14. The apparatus of claim 7, wherein
the UE does not send an LTE or NR measure report to the 4G base station or the 5G base station when the UE satisfies the preset condition.

15. The apparatus of claim 7, wherein the releasing a connection between the UE and the 4G base station or the 5G base station comprises releasing a radio resource occupied on a base station side when the connection between the UE and the 4G base station or the 5G base station is configured.

16. The apparatus of claim 7, wherein the apparatus is the UE or a system chip comprised in the UE.

17. The apparatus of claim 7, wherein sending the SCG link failure message to the 4G base station or the 5G base station comprises:
sending the SCG link failure message to the 5G base station to cause the 5G base station to instruct releasing the connection between the UE and the 4G base station, or
sending, the SCG link failure message to the 4G base station to cause the 4G base station to instruct releasing the connection between the UE and the 5G base station.

18. The apparatus of claim 7, wherein the instructions are for execution by the at least one processor to cause the UE to:
after sending the SCG link failure message to the 4G base station or the 5G base station, receive a first RRC reconfiguration message from the 4G base station or the 5G base station based on the SCG link failure message, wherein the first RRC reconfiguration message is used for instructing the UE to release the connection between the UE and the 4G base station or the 5G base station based on the SCG link failure message.

19. The apparatus of claim 18, wherein the first RRC reconfiguration message comprises release field.

20. A non-transitory computer readable medium comprising instructions for execution by at least one processor to cause an apparatus to:
- establish a dual connection to a 4G base station and a 5G base station by using dual connectivity technology of a radio access network;
- in response to determining that the UE satisfies a preset condition, send a secondary cell group (SCG) link failure message to the 4G base station or the 5G base station for releasing a connection between the UE and the 4G base station or the 5G base station based on the SCG link failure message;
- wherein the preset condition comprising at least one of:
- the UE is in a screen-on state and a data transmission rate of the UE is less than or equal to a first preset rate;
- the UE is in a screen-on state and a size of a data packet that needs to be transmitted by the UE is less than or equal to a first preset threshold;
- a mobile data connection function of the UE is disabled;
- an overall temperature of the UE is greater than or equal to a preset temperature threshold;
- the UE is in a screen-off state a data transmission rate of the UE is less than or equal to a second preset rate; or
- the UE is in a screen-off state and a size of a data packet that needs to be transmitted by the UE is less than or equal to a second preset threshold.

* * * * *

UNITED STATES PATENT AND TRADEMARK OFFICE
CERTIFICATE OF CORRECTION

| | | |
|---|---|---|
| PATENT NO. | : 11,895,583 B2 | Page 1 of 1 |
| APPLICATION NO. | : 17/437526 | |
| DATED | : February 6, 2024 | |
| INVENTOR(S) | : Kai Yuan, Yanzhao He and Chaofeng Lian | |

It is certified that error appears in the above-identified patent and that said Letters Patent is hereby corrected as shown below:

In the Claims

In Column 44, In Line 10, In Claim 11, before "indicates" delete "is used to".

In Column 44, In Line 14, In Claim 12, before "are" delete "being executed".

Signed and Sealed this
Nineteenth Day of August, 2025

Coke Morgan Stewart
*Acting Director of the United States Patent and Trademark Office*